United States Patent
Lee et al.

(10) Patent No.: US 12,438,710 B2
(45) Date of Patent: Oct. 7, 2025

(54) FUNCTIONAL ENCRYPTION SYSTEM AND METHOD OF PERFORMING FUNCTIONAL ENCRYPTION

(71) Applicant: SAMSUNG ELECTRONICS CO., LTD., Suwon-si (KR)

(72) Inventors: Wijik Lee, Suwon-si (KR); Heeseok Eun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 239 days.

(21) Appl. No.: 18/096,687

(22) Filed: Jan. 13, 2023

(65) Prior Publication Data
US 2023/0299955 A1    Sep. 21, 2023

(30) Foreign Application Priority Data

Mar. 21, 2022   (KR) .................. 10-2022-0034459

(51) Int. Cl.
*H04L 9/08*   (2006.01)
*H04L 9/14*   (2006.01)
*H04L 9/30*   (2006.01)

(52) U.S. Cl.
CPC ............. *H04L 9/0866* (2013.01); *H04L 9/14* (2013.01); *H04L 9/3093* (2013.01)

(58) Field of Classification Search
CPC ....... H04L 9/0866; H04L 9/14; H04L 9/3093; H04L 9/0825; H04L 9/0861; H04L 9/3073; H04L 9/083; G06N 20/00
USPC .......................................... 713/171
See application file for complete search history.

(56) References Cited

U.S. PATENT DOCUMENTS

| | | | |
|---|---|---|---|
| 8,913,742 B2 | 12/2014 | Takashima et al. | |
| 8,938,623 B2 | 1/2015 | Takashima et al. | |
| 10,516,534 B2 | 12/2019 | Takashima | |
| 11,012,424 B2 | 5/2021 | Choi et al. | |
| 2013/0114810 A1* | 5/2013 | Kobayashi | H04L 9/14 380/47 |
| 2014/0105403 A1* | 4/2014 | Baldi | H04L 9/304 380/282 |
| 2018/0373859 A1* | 12/2018 | Ganong | G06F 21/64 |
| 2019/0363871 A1* | 11/2019 | Cheon | H04L 9/304 |

(Continued)

FOREIGN PATENT DOCUMENTS

| CN | 112016698 A | * 12/2020 | ............. G06N 20/00 |
|---|---|---|---|
| JP | 5841955 B2 | 1/2016 | |

(Continued)

*Primary Examiner* — Jacob Lipman
(74) *Attorney, Agent, or Firm* — Muir Patent Law, PLLC

(57) ABSTRACT

A functional encryption system includes a key generation device configured to generate a public key and a secret key, based on a master key and a parameter vector, an encryption device configured to generate encrypted data by encrypting an input vector, based on the public key, and a decryption device configured to generate decrypted data corresponding to an approximation value of an inner product of the parameter vector and the input vector by decrypting the encrypted data based on the secret key. Security of data used in machine learning, biometric authentication, etc. may be reinforced and attacks using quantum computers may be blocked by incurring random noise in the decrypted data based on the functional encryption using the LWE problem and the lattice problem.

19 Claims, 24 Drawing Sheets

(56) References Cited

U.S. PATENT DOCUMENTS

2021/0167969 A1  6/2021  Cheon et al.
2021/0306147 A1* 9/2021  Aharoni .................. G06F 21/32

FOREIGN PATENT DOCUMENTS

| KR | 10-1838432 B1 | 4/2018 |
| KR | 10-1880517 B1 | 7/2018 |
| KR | 10-2019-0048422 A | 5/2019 |
| KR | 10-1994236 B1 | 9/2019 |

* cited by examiner

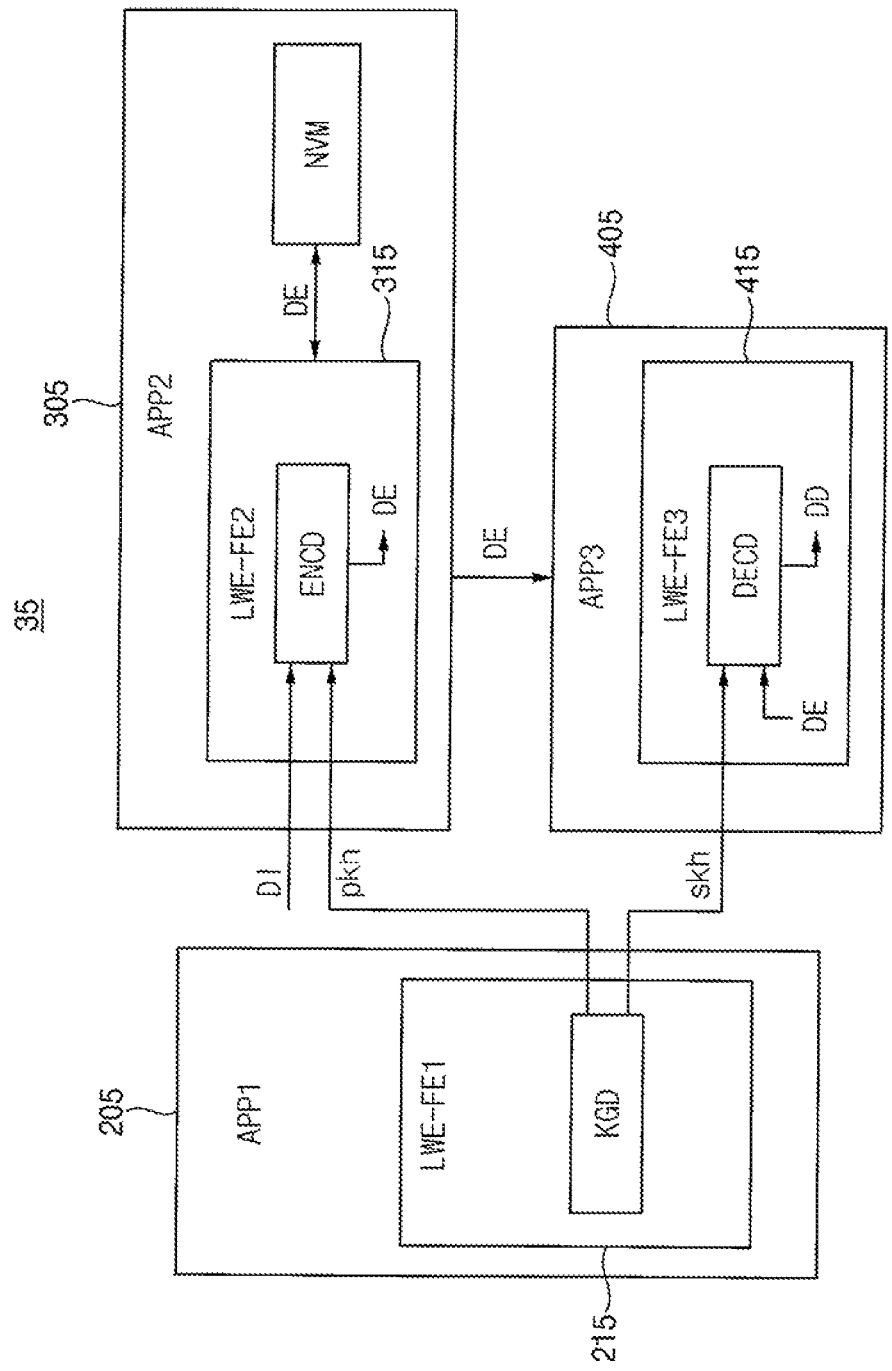

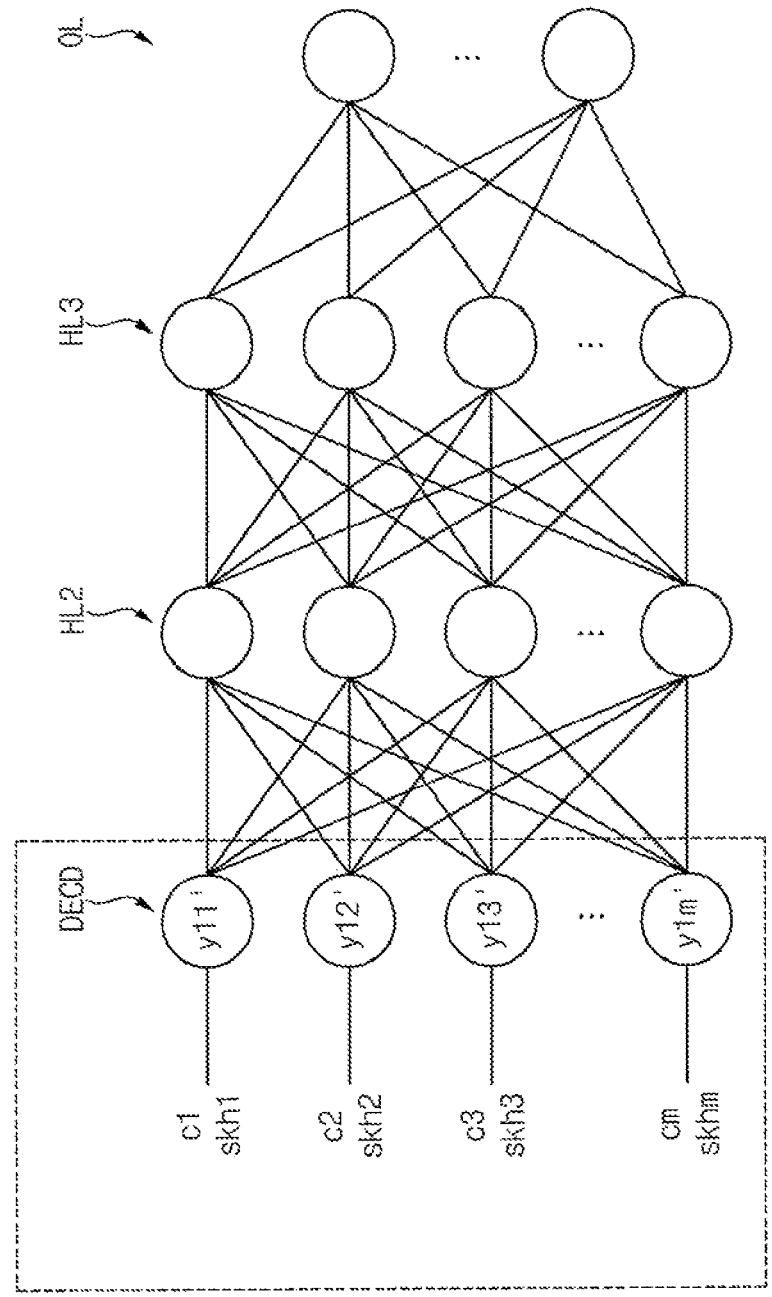

FUNCTIONAL ENCRYPTION SYSTEM AND METHOD OF PERFORMING FUNCTIONAL ENCRYPTION

CROSS-REFERENCE TO RELATED APPLICATION

This U.S. non-provisional application claims priority under 35 USC § 119 to Korean Patent Application No. 10-2022-0034459, filed on Mar. 21, 2022, in the Korean Intellectual Property Office (KIPO), the disclosure of which is incorporated by reference herein in its entirety.

BACKGROUND

1. Field

Example embodiments relate generally to semiconductor integrated circuits, and more particularly to a functional encryption system and a method of performing functional encryption.

2. Description of the Related Art

Encryption schemes include symmetric encryption schemes and asymmetric encryption schemes. The symmetric encryption scheme may have high speed because a key used in decryption is the same as a key used in encryption, but have low security due to key exposure, and the like. The asymmetric encryption scheme has been proposed to solve the problems of the symmetric encryption schemes. The asymmetric encryption scheme utilizes a public key provided to a third party and a secret key possessed solely by a user. The user may receive a cyphertext that is encrypted using the public key and may decrypt the cyphertext using the secret key.

A public key encryption scheme based on learning with error (LWE) was proposed by Regev in 2005. The public key encryption scheme based on LWE and modifications thereof may be referred to as "LWE-based public key encryption". The LWE-based public key encryption is still unsuitable for internet of things (IoT), transport layer security (TLS), cloud computing, server operation, etc., because of large size of parameter, low speed, vulnerability to attack using a quantum computer, and so on.

SUMMARY

An embodiment is directed to a functional encryption system, including: a key generation device configured to generate a public key and a secret key, based on a master key and a parameter vector, an encryption device configured to generate encrypted data by encrypting an input vector, based on the public key, and a decryption device configured to generate decrypted data corresponding to an approximation value of an inner product of the parameter vector and the input vector by decrypting the encrypted data based on the secret key.

An embodiment is directed to a functional encryption system, including: a key generation device configured to generate a plurality of public keys and a secret key, based on a master key and a parameter vector, an encryption device configured to generate a plurality of encrypted data respectively corresponding to the plurality of public keys by encrypting an input vector, based on the plurality of public keys, and a decryption device configured to generate decrypted data corresponding to an approximation value of an inner product of the parameter vector and the input vector by decrypting the plurality of encrypted data based on the secret key. The key generation device, the encryption device and the decryption device generate the plurality of public keys, the secret key, the plurality of encrypted data and the decrypted data based on functional encryption using a learning with error (LWE) problem and a lattice problem.

An embodiment is directed to a method of performing functional encryption, including: generating a public key and a secret key, based on a master key and a parameter vector, generating encrypted data by encrypting an input vector, based on the public key, and generating decrypted data corresponding to an approximation value of an inner product of the parameter vector and the input vector by decrypting the encrypted data based on the secret key.

BRIEF DESCRIPTION OF THE DRAWINGS

Features will become apparent to those of skill in the art by describing in detail example embodiments with reference to the attached drawings in which:

FIGS. 9A, 9B, 9C, 9D, and 9E are block diagrams illustrating a system according to example embodiments.

FIG. 11B is a diagram illustrating machine learning based on decrypted data generated by a method of controlling a machine learning model according to example embodiments.

DETAILED DESCRIPTION

Figure 1:
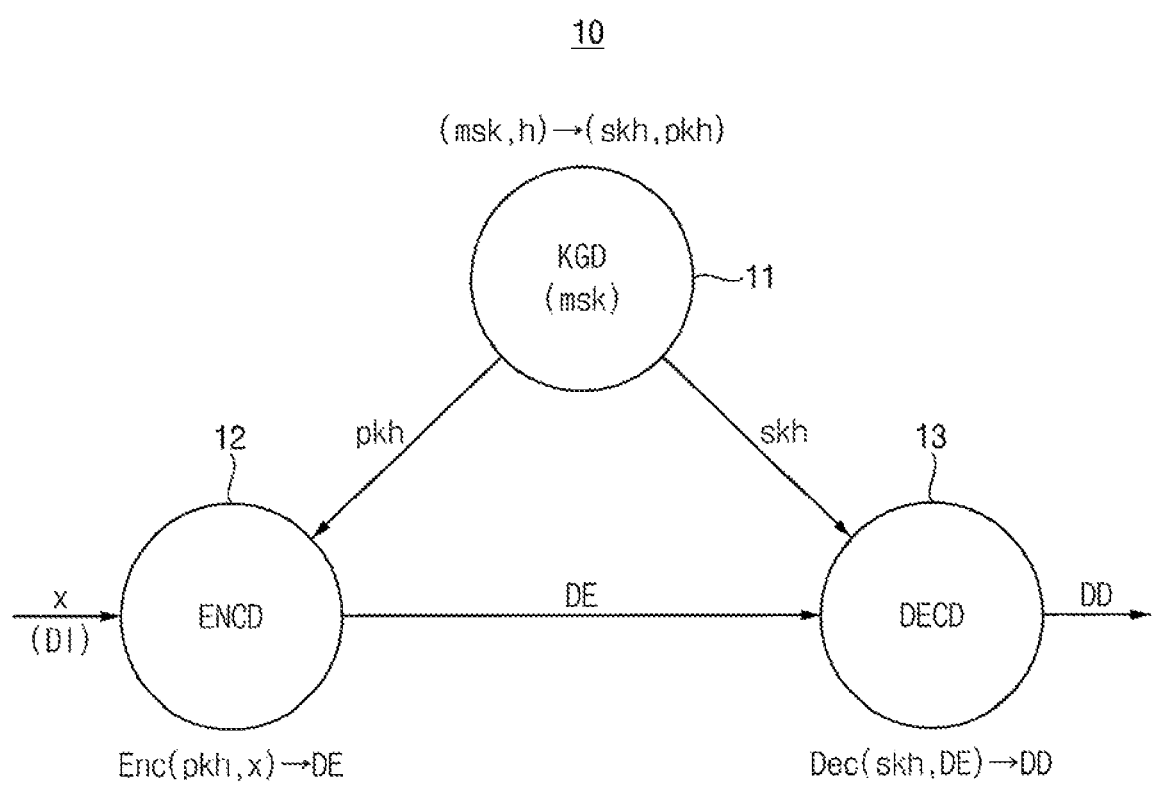
FIG. 1 is a diagram illustrating a functional encryption system according to example embodiments.

FIG. 1 is a diagram illustrating a functional encryption system according to example embodiments.

Referring to FIG. 1, a functional encryption system 10 may include a key generation device KGD 11, an encryption device ENCD 12, and a decryption device DECD 13. The functional encryption system 10 may implement functional encryption using the key generation device 11, the encryption device 12, and the decryption device 13.

As will be described below with reference to FIGS. 10 and 19, the functional encryption system 10 may further include components of controlling a machine learning model, performing authentication, and so on.

Functional encryption may obtain a value to which a function is applied, whereas homomorphic encryption may allow mathematical operations to be performed on encrypted data or cyphertexts.

In general, the functional encryption includes a setup algorithm, a secret key generation algorithm, an encryption algorithm, and a decryption algorithm. The setup algorithm generates a master key and a public key using a security parameter as an input. The secret key generation algorithm generates a secret key using the master key and a given function as inputs. The encryption algorithm generates a cyphertext by encrypting a plaintext with the public key. In this regard, anyone possessing the public key may generate the cyphertext. The decryption algorithm may generate a function value with the secret key such that the function value corresponds to the plaintext to which the function is applied.

The key generation device 11 may perform the setup algorithm and the secret key generation algorithm of the functional encryption. The key generation device 11 may generate a public key pkh and a secret key skh based on a master key msk and a parameter vector h.

The master key msk may be externally provided or generated in the key generation device 11. The system 10 may maintain security to prevent the master key msk from being externally exposed.

The encryption device 12 may perform the encryption algorithm of the functional encryption. The encryption device 12 may generate encrypted data DE by encrypting, based on the public key pkh, an input vector x indicating input data DI.

The decryption device 13 may perform the decryption algorithm of the functional encryption. The decryption device 13 may generate decrypted data DD corresponding to an approximation value of an inner product of the parameter vector h and the input vector x by decrypting the encrypted data DE based on the secret key skh.

The key generation device 11, the encryption device 12, and the decryption device 13 may be implemented as hardware, software, or a combination of hardware and software, where software is program codes that are executed by a processor. The software may be embodied as a tangible article of manufacture embodying code which, when accessed by a machine, cause the machine to perform operations.

According to example embodiments, the key generation device 11, the encryption device 12, and the decryption device 13 may be included in the same system, or may be distributed in respective systems that are connected through various interfaces.

By way of reference, a general functional encryption using discrete logarithm (DL) problem may obtain a decrypted data corresponding to a value (e.g., g<h, x>) of an inter product <h, x> to which a specific function is applied, where <h, x> indicates the inner product of the parameter vector h and the input vector x. However, the functional encryption using DL problem may not provide the inner product itself, and thus functional encryption using the DL problem may be applicable only to restricted scenarios. In contrast, a general functional encryption using learning with error (LWE) problem may provide the inner product itself but the functional encryption using LWE problem is vulnerable to attacks using quantum computers.

According to example embodiments, as will be described with reference to FIGS. 5A, 5B, and 5C, the decrypted data DD may be generated based on the functional encryption using LWE problem and lattice problem such that the decrypted data DD is not the inner product <h, x> itself, but an approximation value of the inner product <h, x>. In this regard, random noise may be included in the decrypted data DD based on the functional encryption using the LWE problem and the lattice problem such that the decrypted data DD may be different from the inner product <h, x>. Using such decrypted data DD, security of the data used in machine learning and authentication may be reinforced and block the attacks using the quantum computer.

Figure 2:
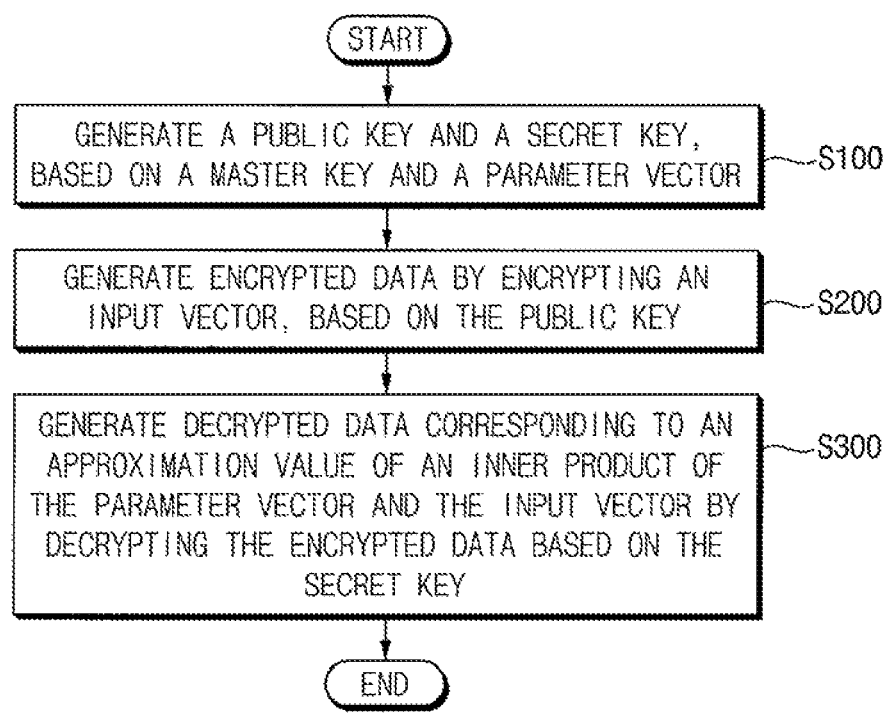
FIG. 2 is a flowchart illustrating a method of performing functional encryption according to example embodiments.

FIG. 2 is a flowchart illustrating a method of performing functional encryption according to example embodiments.

Referring to FIGS. 1 and 2, the key generation device 11 may generate the public key pkh and the secret key skh, based on the master key msk and the parameter vector h (S100). An example embodiment of generating the public key pkh and the secret key skh will be described below with reference to FIG. 7A.

The encryption device 12 may generate the encrypted data DE by encrypting the input vector x, based on the public key pkh (S200). An example embodiment of generating the encrypted data DE will be described below with reference to FIG. 7B.

The decryption device 12 may generate the decrypted data DD corresponding to the approximation value of the inner product of the parameter vector h and the input vector x by decrypting the encrypted data DE based on the secret key skh (S300). An example embodiment of generating the decrypted data DD will be described below with reference to FIG. 7C.

As such, the functional encryption system 10 and the method of performing functional encryption according to example embodiments may reinforce security of data used in machine learning, biometric authentication, etc., and may block attacks using quantum computers by incurring random noise in the decrypted data DD based on the functional encryption using the LWE problem and the lattice problem.

Figure 3:
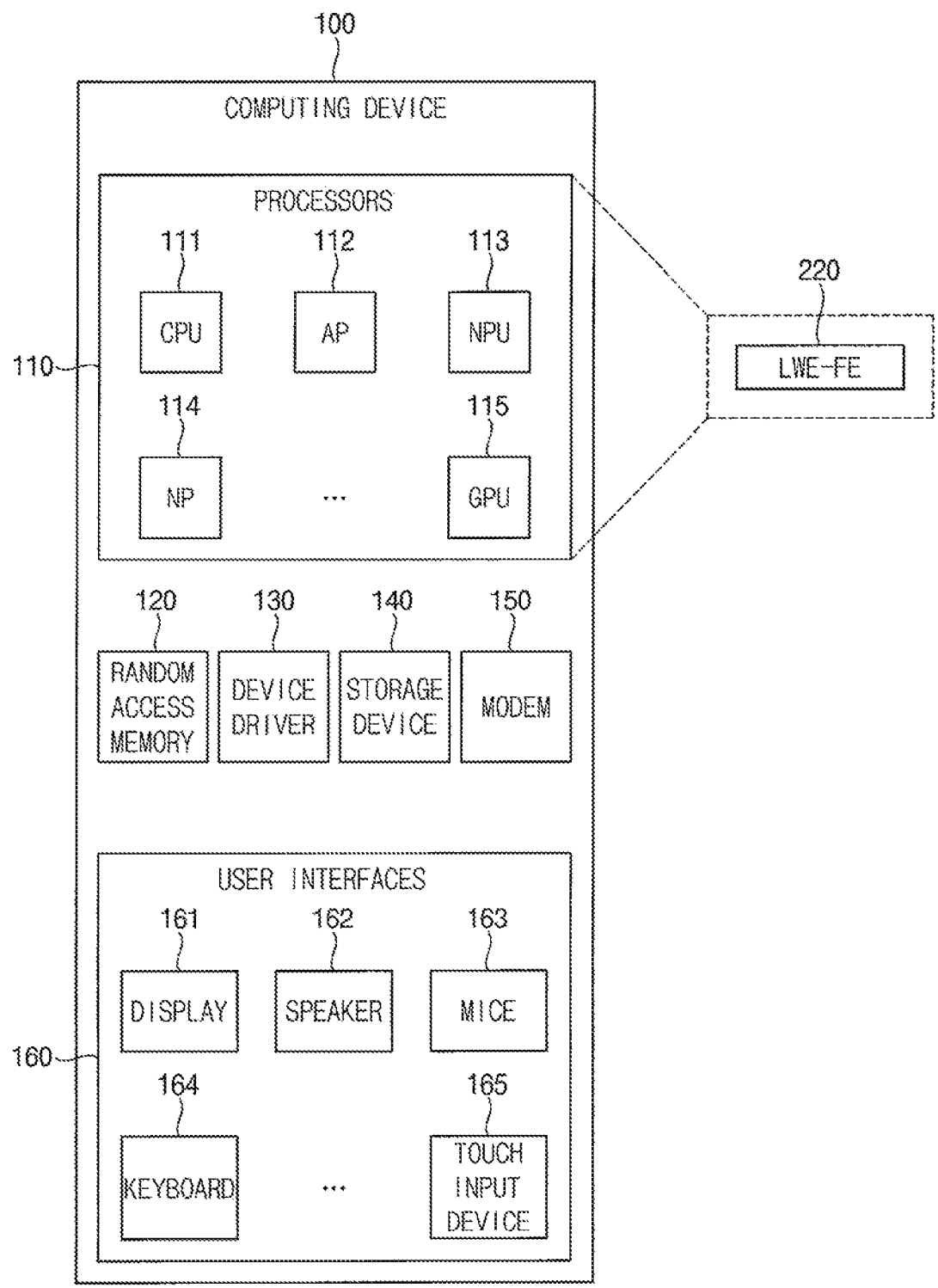
FIG. 3 is a block diagram illustrating a computing device according to example embodiments.

FIG. 3 is a block diagram illustrating a computing device according to example embodiments.

Referring to FIG. 3, a computing device 100 may include processors 110, a random access memory 120, a device driver 130, a storage device 140, a modem 150, and user interfaces 160.

At least one processor of the processors 110 may be configured to implement a learning with error functional encryption (LWE-FE) module 220. According to example embodiments, the LWE-FE module 220 may perform all or a portion of the functional encryption as described with reference to FIGS. 1 and 2.

In some example embodiments, LWE-FE module 220 may be implemented as instructions (and/or program codes) that may be executed by the at least one of the processors 110. The instructions (and/or program codes) of the LWE-FE module 220 may be stored in computer-readable media. For example, the at least one processor may load (and/or read) the instructions to (and/or from) the random access memory 120 and/or the storage device 140.

In some example embodiments, the at least one processor may be manufactured to efficiently execute instructions included in the LWE-FE module 220. For example, the at least one processor may be a dedicated processor that is implemented (e.g., in hardware) based on the LWE-FE module 220. In some example embodiments, the at least one processor may receive information corresponding to the LWE-FE module 220 to operate the LWE-FE module 220.

The processors 110 may include, for example, at least one general-purpose processor such as a central processing unit (CPU) 111, an application processor (AP) 112, and/or other processing units. In addition, the processors 110 may include at least one special-purpose processor such as a neural processing unit (NPU) 113, a neuromorphic processor (NP) 114, a graphic processing unit (GPU) 115, etc. For example, the processors 110 may include two or more heterogeneous processors. Though the processors 110 are illustrated as including the CPU 111, AP 112, NPU 113, NP 114, and GPU 115, example embodiments are not so limited. For example, the processors 110 may include more or fewer processors than illustrated.

The random access memory 120 may be used as an operation memory of the processors 110, a main memory, and/or a system memory of the computing device 100. The random access memory 120 may include a volatile memory such as a dynamic random access memory (DRAM), a static random access memory (SRAM), and/or the like. Additionally (and/or alternatively), the random access memory 120 may include a nonvolatile memory such as a phase-change random access memory (PRAM), a ferroelectrics random access memory (FRAM), a magnetic random access memory (MRAM), a resistive random access memory (RRAM), and/or the like.

The device driver 130 may control peripheral circuits such as the storage device 140, the modem 150, the user interfaces 160, etc., according to requests of the processors 110. The storage device 140 may include a fixed storage device such as a hard disk drive, a solid-state drive (SSD), etc., and/or include (and/or be connected to) an attachable storage device such as an external hard disk drive, an external SSD, a memory card, and/or other external storage.

The modem 150 may perform wired and/or wireless communication with external devices through various communication methods and/or communication interface protocols such as Ethernet, WiFi, LTE, a third-generation communication system such as code division multiple access (CDMA), global system for mobile communications (GSM), north American digital cellular (NADC), extended-time division multiple access (E-TDMA), and/or wide band code division multiple access (WCDMA), a fourth generation communication system such as 4G LTE, a fifth generation communication system such as 5G mobile communication, and/or other communication methods.

The user interfaces 160 may receive information from a user and provide information to the user. The user interfaces 160 may include at least one output interface such as a display 161, a speaker 162, etc., and may further include at least one input interface such as mice (or a mouse) 163, a keyboard 164, a touch input device 165, etc. Though illustrated as including the display 161, the speaker 162, the mice 163, the keyboard 164, and the touch input device 165, example embodiments are not so limited, and may, e.g., include more or fewer elements. In some example embodiments, for example, some of the user interfaces 160 may be combined (e.g., to include a touch screen and/or the like).

In some example embodiments, the LWE-FE module 220 may receive the instructions (and/or program codes) through the modem 150 and store the instructions in the storage device 140. In some example embodiments, the instructions of the LWE-FE module 220 may be stored in an attachable storage device and the attachable storage device may be connected to the computing device 100 by a user. The instructions of the LWE-FE module 220 may be loaded in the random access memory 120 for rapid execution of the instructions.

In some example embodiments, at least one of the computer program codes, the machine learning model, and/or the training control module may be stored in a transitory and/or non-transitory computer-readable medium. In some example embodiments, values resulting from a simulation performed by the processor and/or values obtained from arithmetic processing performed by the processor may be stored in a transitory and/or non-transitory computer-readable medium. In some example embodiments, intermediate values generated during machine learning may be stored in a transitory and/or non-transitory computer-readable medium. In some example embodiments, at least one of the training data, the process data, the device data, the simulation result data, the prediction current-voltage curve, and/or the uncertainty data may be stored in a transitory and/or non-transitory computer-readable medium. However, example embodiments are not limited thereto.

Figure 4:
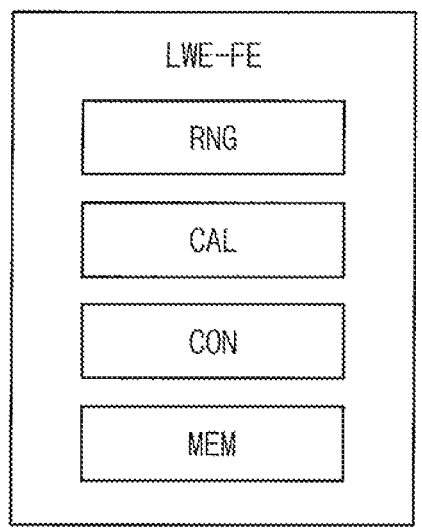
FIG. 4 is a block diagram illustrating a learning with error functional encryption (LWE-FE) device included in a functional encryption system according to example embodiments.

FIG. 4 is a block diagram illustrating a learning with error functional encryption (LWE-FE) device included in a functional encryption system according to example embodiments.

Referring to FIG. 4, an LWE-FE device may include a random number generator RNG, an operation circuit CAL, a controller CON, and a memory MEM.

The random number generator RNG may provide random numbers to the controller CON, and the controller CON may generate the random numbers and the random vectors for the functional encryption as will be described with reference to FIGS. 7A, 7B, and 7C.

The operation circuit CAL may perform operations such as addition, subtraction, multiplication, and matrix operations. Here the matrix may include the n×1 vector and the 1×n vector. In some example embodiments, the operation circuit CAL may include a Chinese Remainder Theorem (CRT) operator and perform q-ary operation using the CRT operator.

The LWE-FE device may be implemented to perform all or a portion of the functions of the key generation device 11, the encryption device 12, and the decryption device 13 as described above. When the LWE-FE performs all functions of the devices 11, 12, and 13, at least a portion of the random number generator RNG, the operation circuit CAL, the controller CON, and the memory MEM may be common resources shared by the devices 11, 12, and 13.

Figure 5:
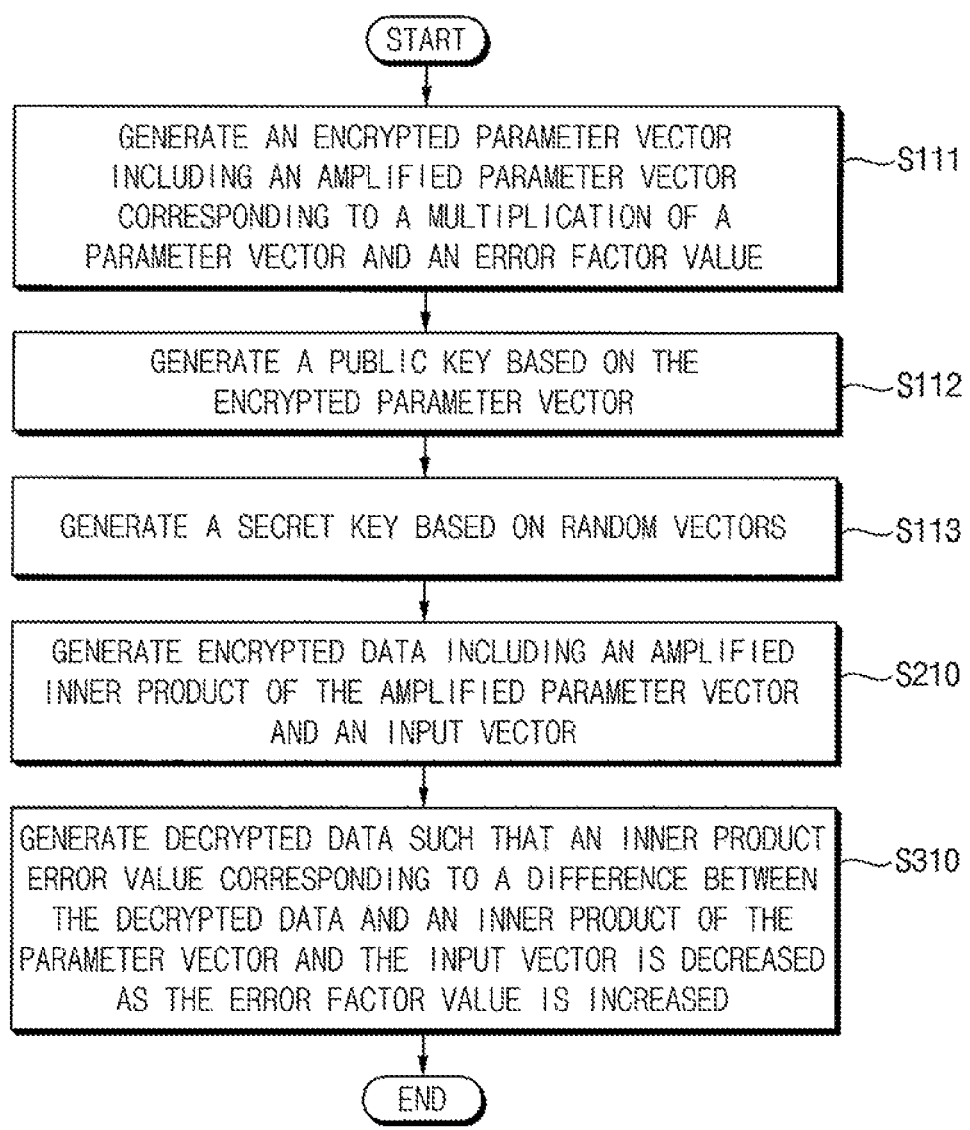
FIGS. 5 and 6 are flowcharts illustrating a method of performing functional encryption according to example embodiments.
Figure 6:
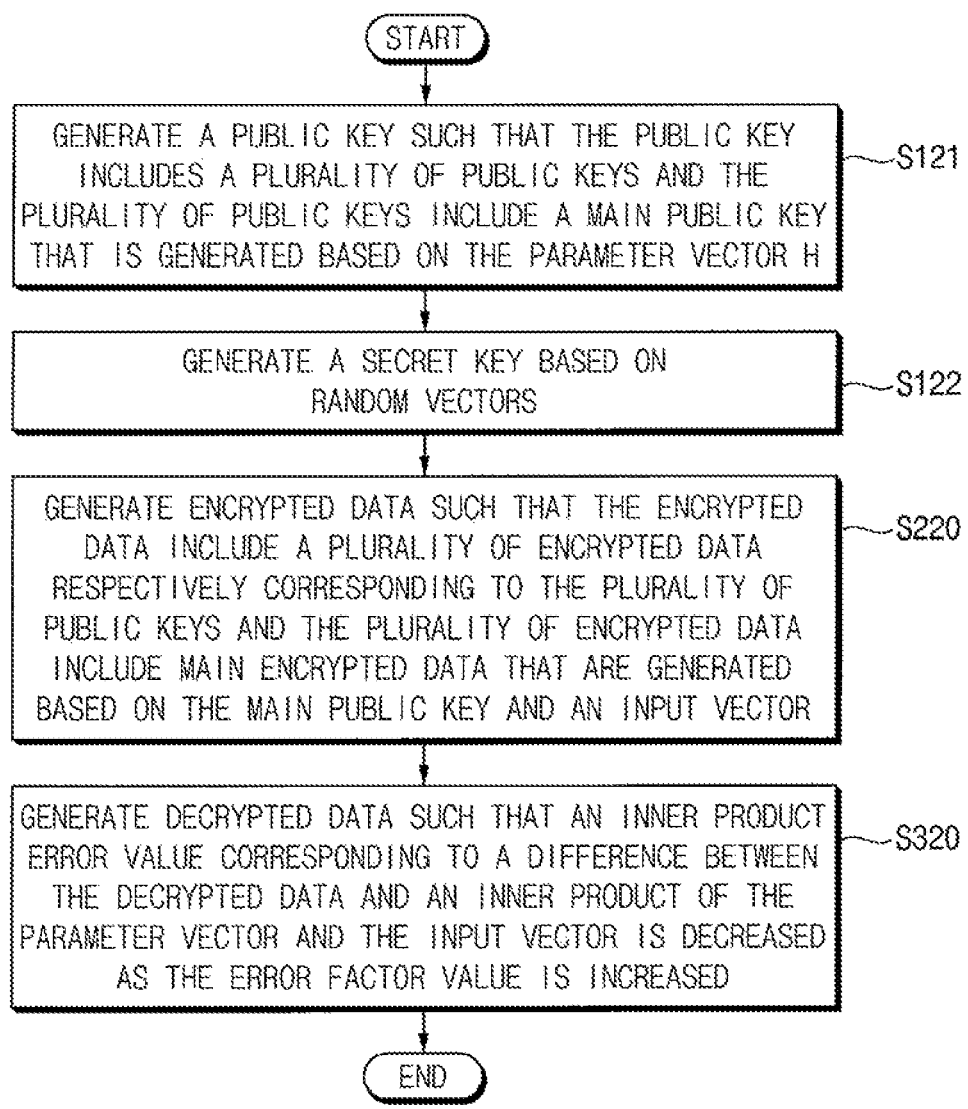

FIGS. 5 and 6 are flowcharts illustrating a method of performing functional encryption according to example embodiments.

Referring to FIGS. 1 and 5, the key generation device 11 may generate an encrypted parameter vector v including an amplified parameter vector Nh corresponding to a multiplication of the parameter vector h and an error factor value N (S111), and generate the public key pkh based on the encrypted parameter vector v (S112). In addition, the key generation device 11 may generate a secret key skh based on random vectors (S113).

The encryption device 12 may generate the encrypted data DE including an amplified inner product $Nh^T x$ of the amplified parameter vector Nh and the input vector x (S210).

The decryption device 13 may generate the decrypted data DD such that an inner product error value E corresponding to a difference between the decrypted data DD and the inner product $h^T x$ may be decreased as the error factor value N is increased (S310). For example, the decryption device 13 may perform the decryption such that the inner product error value E may be inversely proportional to the error factor value N.

The error factor value N may be adjusted properly considering the trade-off relation of security and accuracy of the decrypted data DD. As the error factor value N is increased, the inner product error value E may be decreased, that is, the decrypted data DD may approach near the exact inner product $h^T x$ of the parameter vector h and the input vector x, and thus the accuracy of the decrypted data DD may be increased. In contrast, as the error factor value N is decreased, the inner product error value E may be increased and the decrypted data DD may be far from the exact inner product $h^T x$ and thus the security of the decrypted data DD may be increased.

Referring to FIGS. 1 and 6, the key generation device 11 may generate the public key pkh such that the public key pkh includes a plurality of public keys. The plurality of public keys may include a main public key that is generated based on the parameter vector h (S121). In addition, the key generation device 11 may generate a secret key skh based on random vectors (S122).

The encryption device 12 may generate encrypted data DE such that the encrypted data DE may include a plurality of encrypted data respectively corresponding to the plurality of public keys, and the plurality of encrypted data include main encrypted data that are generated based on the main public key and an input vector x (S220).

The decryption device 13 may generate the decrypted data DD such that an inner product error value E corresponding to a difference between the decrypted data DD and the inner product $h^T x$ may be decreased as the error factor value N is increased (320).

A third party may not discern the main public key among the plurality of public keys and may not discern the main encrypted data among the plurality of encrypted data. As such, the security of the encrypted data DE may be further increased by generating the plurality of encrypted data using the plurality of public keys.

The learning with error (LWE) problem is a computational problem in inferring a q-ary function f from a finite ring from given samples of Yi=f(xi). The LWE problem may be designed to be solved difficultly for encryption.

The lattice problem is an optimization problem associated with mathematical objects called lattices. The lattice problem is a non-deterministic polynomial-time hardness (NP) problem, and the lattice problem may include shortest vector problem (SVP), closest vector problem (CVP), and so on.

Hereinafter, example embodiments of functional encryption using the LWE problem and the lattice problem are described with reference to FIGS. 7A, 7B, and 7C.

Figure 7A:
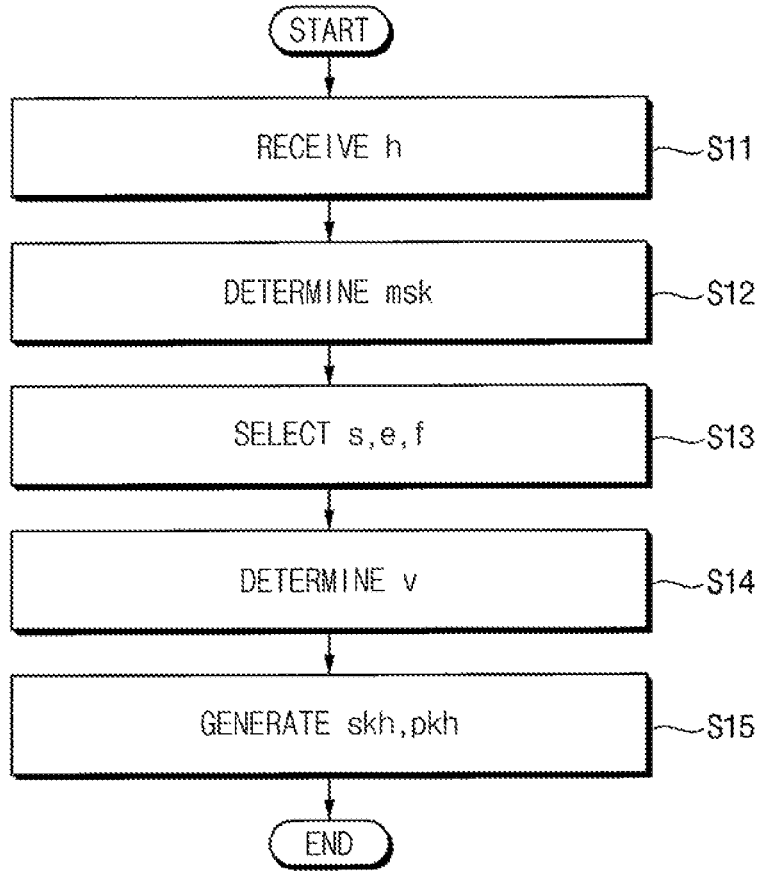
FIG. 7A is a flow chart illustrating key generation in a method of performing functional encryption according to example embodiments.

FIG. 7A is a flow chart illustrating key generation in a method of performing functional encryption according to example embodiments.

Referring to FIGS. 1 and 7A, the key generation device 11 may receive the parameter vector h from an external device (S11). In some example embodiments, as will be described below with reference to FIGS. 10 through 18, the parameter vector h may indicate parameters of a first hidden layer of a machine learning model MLM, and the key generation device 11 may receive the parameter vector h from a machine learning engine MLE controlling the machine learning model MLM.

The key generation device 11 may determine the master key msk (S12). In some example embodiments, the key generation device 11 may determine the master key msk based on Expression 1.

$$u \leftarrow \mathbb{Z}_q^n, A \leftarrow \mathbb{Z}_q^{n \times n}$$

$$u_T \cdot A = \mu^T, |\mu| < L$$

$$msk = u \qquad \text{Expression 1}$$

In Expression 1, with respect to ring of integers $\mathbb{Z}_q$, $\mathbb{Z}_q^n$ indicates a set of n×1 matrices, and $\mathbb{Z}_q^{n \times n}$ indicates a set of n×n matrices. Accordingly, u is an n×1 vector and A is an n×n matrix.

The key generation device 11 may determine the vector u satisfying $u^T \cdot A = \mu^T$ as the master key msk, with respect to an n×1 random vector μ such that the norm of μ is smaller than L, that is, satisfying |μ|<L. Here, A is a random matrix and an invertible matrix, UT and μT indicate transpose matrices of u and μ, and thus UT and μT are 1×n vectors.

The key generation device 11 may select random vectors s, e, and f (S13) as Expression 2.

$$Q = \{r | |r| \leq B\}$$

$$s, e, f \leftarrow Q \qquad \text{Expression 2}$$

In Expression 5, Q indicates a set of n×1 vectors r such that the norm of r is smaller than B, that is, satisfying |r|≤B. The random vectors s, e and f may be selected from Q.

The key generation device 11 may determine an encrypted parameter vector v (S14) as Expression 3.

$$v = s - (A)^{-1} \cdot Nh - u \qquad \text{Expression 3}$$

The key generation device 11 may perform a matrix operation of an inverse matrix $(A)^{-1}$ and an amplified parameter vector Nh where the amplified parameter vector Nh is a multiplication of an error factor value N and the parameter vector h, and determine the encrypted parameter vector v using the random vector s and the vector u corresponding to the master key msk. As such, the encrypted parameter vector v may include the amplified parameter vector Nh.

The key generation device 11 may generate the secret key skh and the public key pkh based on the encrypted parameter vector v, the random matrix A and the random vectors s, e, and f based on Expression 4.

$(skh, pkh) = (s, (pk1, pk2, pk3))$ $pk1 = A \cdot s + e,$ $pk2 = A,$ $pk3 = A \cdot v + f$ Expression 4

As represented by Expression 4, the secret key skh may be the random vector s, the public key pkh may include a first key pk1 corresponding to a vector As+e, a second key pk2 corresponding to the random matrix A, and a third key pk3 corresponding to a vector Av+f. As described above, the encrypted parameter vector v includes the amplified parameter vector Nh corresponding to the multiplication of the parameter vector h and the error factor value N. In other words, the third public key pk3 in Expression 4 may correspond to the main public key that is generated based on the parameter vector h as described with reference to FIG. 6.

The key generation device 11 may generate the encrypted parameter vector v by performing a matrix multiplication of an inverse matrix $(A)^{-1}$ of the random matrix A and the amplified parameter vector Nh as represented by Expression 3, and generate the public key, that is, the third public key by performing a matrix multiplication of the random matrix A and the encrypted parameter vector v as represented by Expression 4.

Figure 7B:
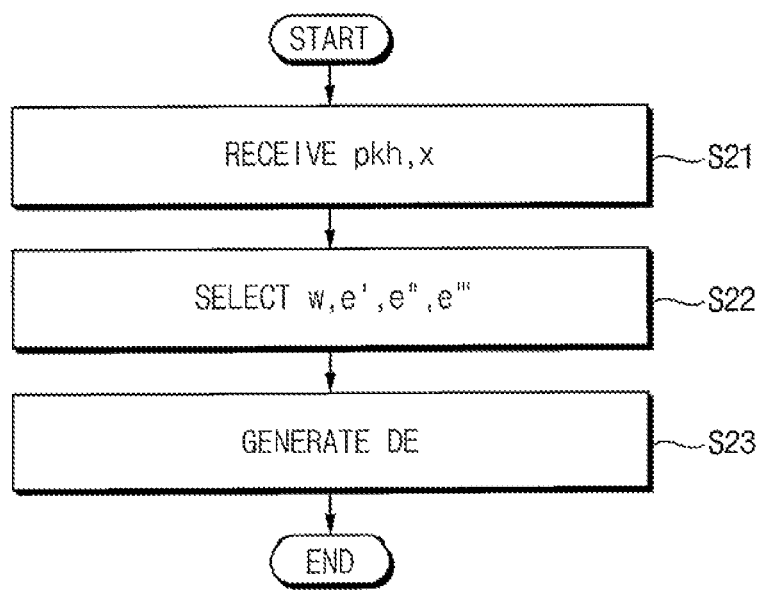
FIG. 7B is a flow chart illustrating encryption in a method of performing functional encryption according to example embodiments.

FIG. 7B is a flow chart illustrating encryption in a method of performing functional encryption according to example embodiments.

Referring to FIGS. 1 and 7B, the encryption device 12 may receive the public key pkh and the input vector x (S21). The encryption device 12 may receive the public key pkh from the key generation device 11 and the input vector x from an external device.

The encryption device 12 may select random vectors w, e" and random values e' and e'" (S22) as Expression 5.

$Q = \{r \| |r| \leq B\}$ $Q_1 = \{r_1 \| |r_1| \leq M\}$ $w, e'' \leftarrow Q$ $e', e''' \leftarrow Q_1$ Expression 5

In Expression 5, Q indicates the set of n×1 vectors r such that the norm of r is smaller than B, that is, satisfying |r|≤B, and $Q_1$ indicates a set of values such that each absolute value is smaller than M. The random vectors w and e" may be selected from Q. The random values e' and e'" may be selected from $Q_1$.

The encryption device 12 may generate the encrypted data DE based on the first key pk1, the second key pk2, and the third key pk3, which correspond to the public key pkh (S23), as Expression 6.

$DE = (C_1, C_2, C_3)$ $C1 = pk1^T \cdot w + e'$ $C2 = pk2 \cdot (x + w) + e'',$ $C3 = pk3^T \cdot x + e'''$ Expression 6

As represented by Expression 6, the encrypted data DE may include first encrypted data C1 corresponding to the first public key pk1 and a value (that is, a scalar value) $pk_1^T \cdot w + e'$, a second encrypted data C2 corresponding to the second public key pk2 and a vector $pk_2 \cdot (x+w) + e''$, and a third encrypted data C3 corresponding to the public key pk3 and a value $pk_3^T \cdot x + e'''$. The third public key pk3 may include the encrypted parameter vector v as represented by Expression 4, and the encrypted parameter vector v includes the amplified parameter vector Nh as represented by Expression 3. In other words, the third encrypted data C3 may correspond to the main encrypted data corresponding to the amplified inner product $Nh^T x$ of the amplified parameter vector Nh and the input vector x as described with reference to FIG. 6.

Figure 7C:
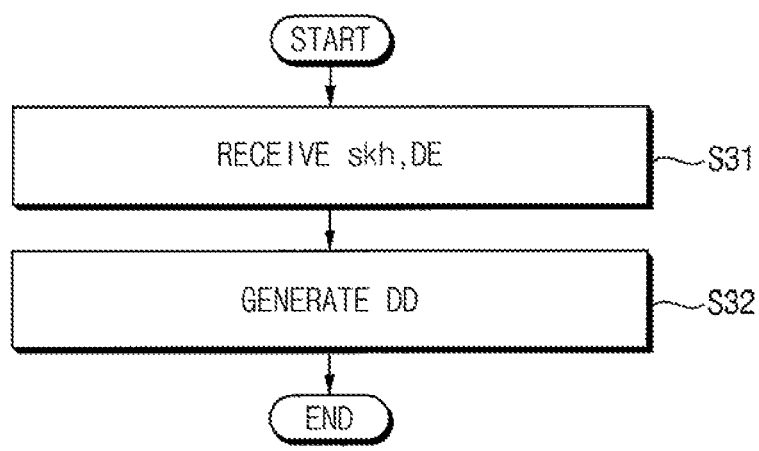
FIG. 7C is a flow chart illustrating decryption in a method of performing functional encryption according to example embodiments.

FIG. 7C is a flow chart illustrating decryption in a method of performing functional encryption according to example embodiments.

Referring to FIGS. 1 and 7C, the decryption device 13 may receive the secret key skh and the encrypted data DE (S31). The decryption device 13 may receive the secret key skh from the key generation device 11 and the encrypted data DE from the encryption device 12.

The decryption device 13 may generate the decrypted data DD by decrypting the first encrypted data C1, the second encrypted data C2, and the third encrypted data C3, which are corresponding to the encrypted data DE based on the secret key skh (S32), as Expression 7.

$$DD = \frac{1}{N} \cdot (skh^T \cdot C_2 - C_1 - C_3) = h^T \cdot x + E \approx h^T \cdot x$$ Expression 7

As a result, as shown in Expression 7, the decrypted data DD may be represented by a sum of the inner product $h^T \cdot x$ of the parameter vector h and the input vector x and an inner product error value E. The inner product error value is calculated as Expression 8.

$$|E| = \frac{1}{N} |(\mu - f)^T \cdot x + s^T \cdot e'' + e^T \cdot w + e' - e'''|$$ Expression 8

As shown in Expression 8, the inner product error value E may be represented by the error factor value N, the input vector x, the random vectors μ, f, s, e", e, and w, and the random values e' and e'". The absolute value of the inner product error value E may be decreased and the decrypted data DD may approach the inner product $h^T \cdot x$, as the error factor value N is increased.

Figure 8:
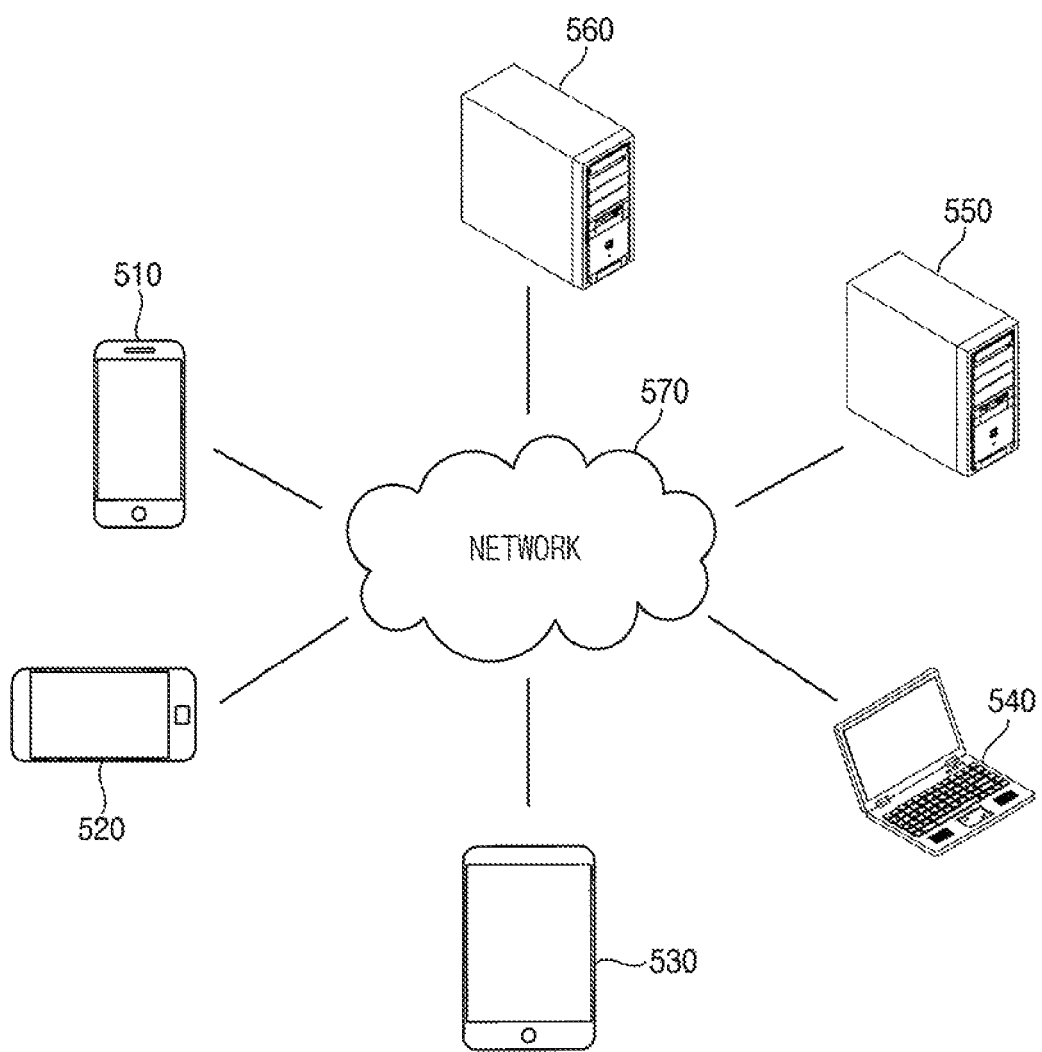
FIG. 8 is a diagram illustrating a network environment according to example embodiments.

FIG. 8 is a diagram illustrating a network environment according to example embodiments.

Referring to FIG. 8, an example network environment of FIG. 8 may include a plurality of electronic devices 510, 520, 530, 540, 550, and 560 and a network 570. Some of the electronic devices 550 and 560 may correspond to servers. The number of the electronic devices and the number of the servers may be determined variously.

The electronic devices 510, 520, 530, and 540 may be fixed devices or mobile devices implemented by computing devices. The electronic devices 510, 520, 530, and 540 may include a smartphone, a mobile phone, a navigation device, a personal computer (PC), a notebook, a digital broadcasting terminal, a personal digital assistant (PDA), a portable multimedia player (PMP), a tablet PC, and so on. For example, the electronic device 510 may communicate with the electronic device 520, 530, and 540 and/or the servers 550 and 560. According to example embodiments, at least one of the electronic devices 510, 520, 530, and 540 may include a camera and/or a sensor configured to obtain biometric data of a user such as a face, a fingerprint, an iris, and so on.

The communication schemes may include the near field wireless communication between the electronic devices 510, 520, 530, 540, 550, and 560 as well as the communication schemes using the network 570 such as a mobile communication network, a wired internet, a wireless internet, a broadcasting network, and so on. For example, the network 570 may include at least one of PAN (personal area network), LAN (local area network), CAN (campus area network), MAN (metropolitan area network), WAN (wide area network), BBN (broadband network), internet, etc. In addition, the network 570 may include at least one of a bus network, a star network, a ring network, a mesh network, a star-bus network, a tree or hierarchical network, and so on.

Each of the servers 550 and 560 may be implemented with at least one computing device configured to communicate with the electronic devices 510, 520, 530, and 540 through the network 570 to provide instructions, codes, files, contents, services, and so on.

Hereinafter, example embodiments of distributing functions for performing the functional encryption to one or more devices with reference to FIGS. 9A through 9E.

FIGS. 9A, 9B, 9C, 9D, and 9E are block diagrams illustrating a system according to example embodiments. FIGS. 9A through 9E illustrate only components for describing example embodiments for convenience of illustration.

Figure 9A:
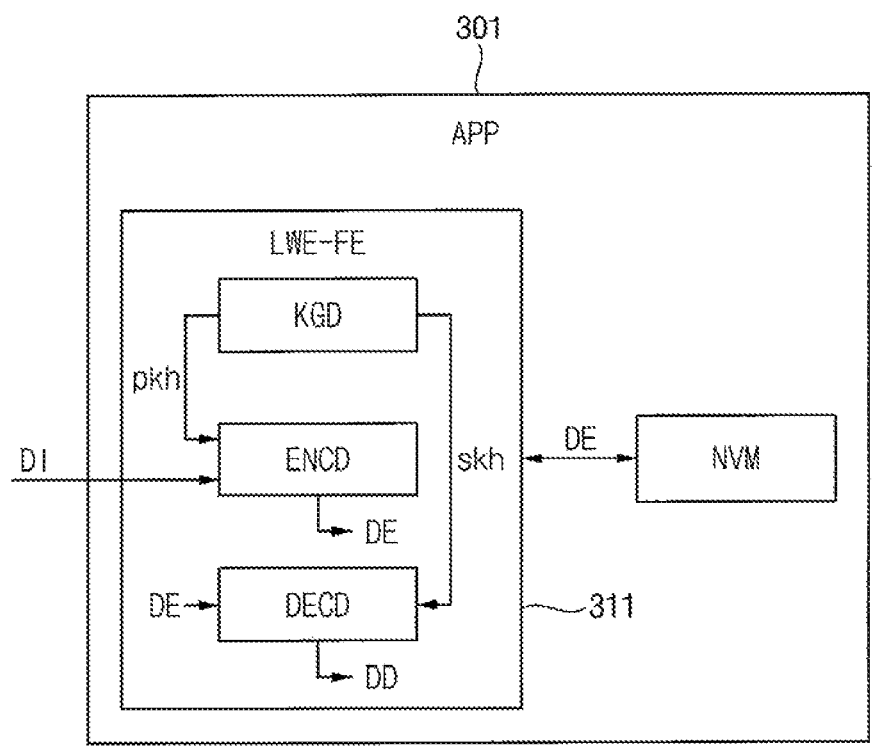

FIG. 9A illustrates an example embodiment that a functional encryption system is implemented in a single electronic device. In this case, the key generation device 11, the encryption device 12, and the decryption device 13 of FIG. 1 may be included in the single electronic device.

Referring to FIG. 9A, a functional encryption system 31 may be implemented in a single electronic device APP 301. A functional encryption device LWE-FE included in the electronic device 301 may include a key generator KGD, an encryptor ENCD, and a decryptor DECD.

The key generator KGD may generate the public key pkh and the secret key skh.

The encryptor ENCD may receive the input data DI of the machine learning model from an external device, receive the public key pkh from the key generator KGD, and generate the encrypted data DE by encrypting the input data DI.

The decryptor DECD may receive the secret key skh from the key generator KGD, and generate the decrypted data DD by decrypting the encrypted data DE.

In some example embodiments, the electronic device 301 may store the encrypted data DE in a nonvolatile memory device NVM. For example, as will be described below with reference to FIGS. 10 through 18, when the machine learning engine performs training or inference of the machine learning model, the electronic device 301 may generate the decrypted data DD by reading the encrypted data DE from the nonvolatile memory device NVM and decrypting the encrypted data DE.

Figure 9B:
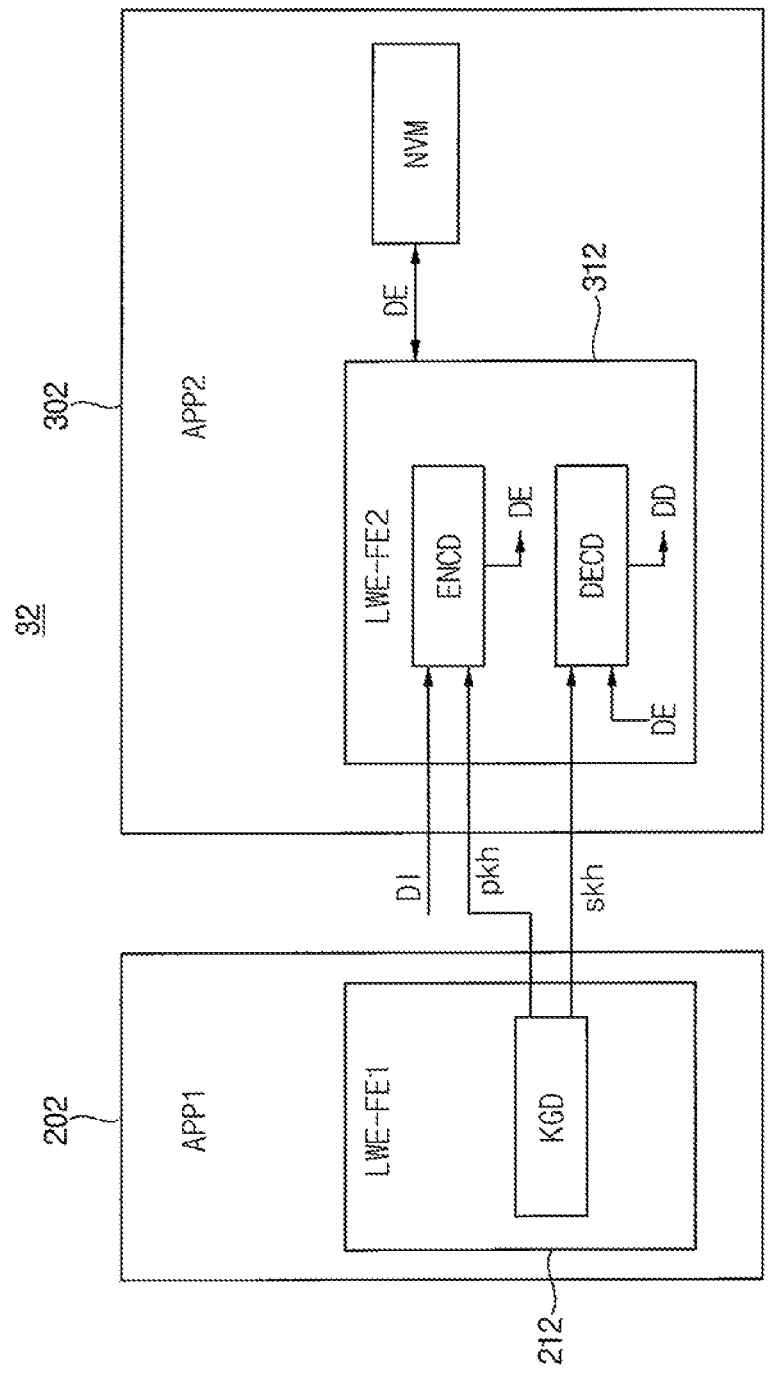
Figure 9C:
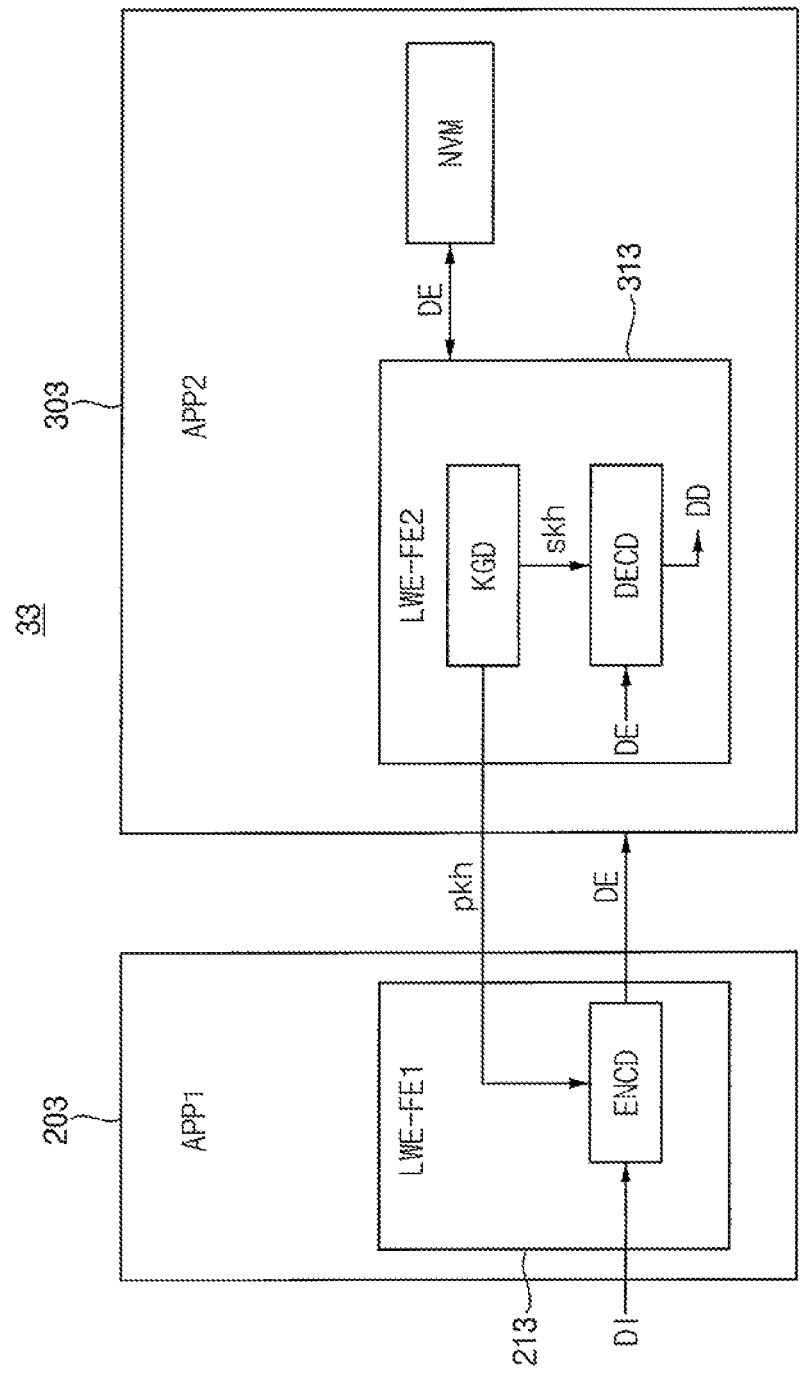
Figure 9D:
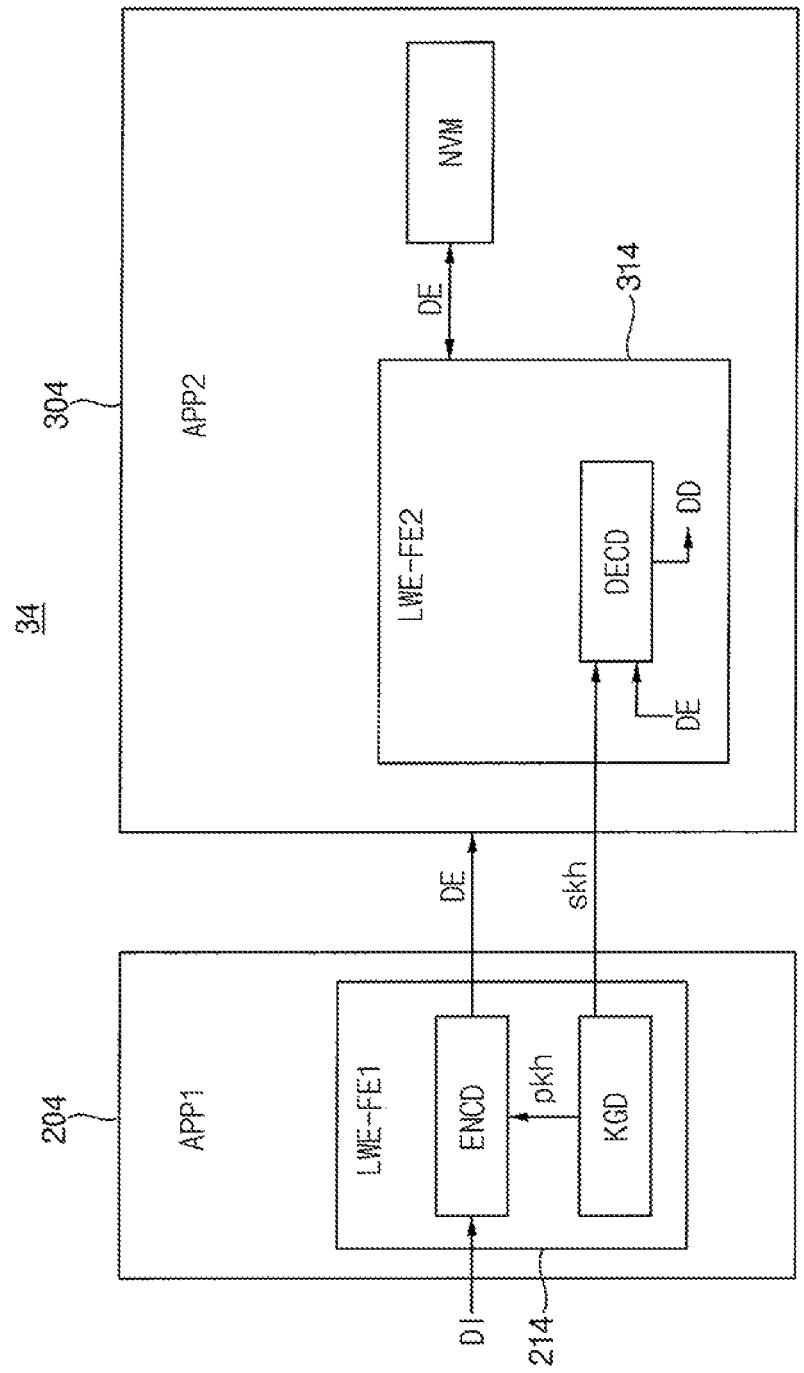

FIGS. 9B, 9C, and 9D illustrate example embodiments that a functional encryption system is implemented in two electronic devices. In this case, the key generation device 11, the encryption device 12, and the decryption device 13 of FIG. 1 may be distributed in the two electronic devices.

Referring to FIG. 9B, a functional encryption system 32 may include a first electronic device APP1 202 and a second electronic device APP2 302. The first electronic device 202 may include a first functional encryption device LWE-FE1 212. The second electronic device 302 may include a second functional encryption device LWE-FE2 312.

The first functional encryption device 212 may include a key generator KGD configured to generate the public key pkh and the secret key skh.

The second functional encryption device 312 may include an encryptor ENCD configured to receive the public key pkh and the input data DI from an external device, and generate the encrypted data DE by encrypting the input data DI. The second functional encryption device 312 may also include a decryptor DECD configured to receive the secret key skh from the first electronic device 202, and generate the decrypted data DD by decrypting the encrypted data DE.

In some example embodiments, the second electronic device 302 may store the encrypted data DE in a nonvolatile memory device NVM.

Referring to FIG. 9C, a functional encryption system 33 may include a first electronic device APP1 203 and a second electronic device APP2 303. The first electronic device 203 may include a first functional encryption device LWE-FE1 213. The second electronic device 303 may include a second functional encryption device LWE-FE2 313.

The first functional encryption device 213 may include an encryptor ENCD configured to receive the public key pkh from the second electronic device 303, and generate the encrypted data DE by encrypting the input data DI.

The second functional encryption device 313 may include a key generator KGD configured to generate the public key pkh and the secret key skh. The second functional encryption device 313 may also include a decryptor DECD configured to receive the encrypted data DE from the first electronic device 203, and generate the decrypted data DD by decrypting the encrypted data DE.

In some example embodiments, the second electronic device 303 may store the encrypted data DE in a nonvolatile memory device NVM.

Referring to FIG. 9D, a functional encryption system 34 may include a first electronic device APP1 204 and a second electronic device APP2 304. The first electronic device 204 may include a first functional encryption device LWE-FE1 214. The second electronic device 304 may include a second functional encryption device LWE-FE2 314.

The first functional encryption device 214 may include a key generator KGD configured to generate the public key pkh and the secret key skh. The first functional encryption device 214 may also include an encryptor ENCD configured to receive the public key pkh from the key generator KGD, and generate the encrypted data DE by encrypting the input data DI.

The second functional encryption device 314 may include a decryptor DECD configured to receive the secret key skh and the encrypted data DE from the first electronic device 204, and generate the decrypted data DD by decrypting the encrypted data DE.

In some example embodiments, the second electronic device 304 may store the encrypted data DE in a nonvolatile memory device NVM.

FIG. 9E illustrates an example embodiment that a functional encryption system is implemented in three electronic devices. In this case, the key generation device 11, the encryption device 12, and the decryption device 13 of FIG. 1 may be distributed in the three electronic devices.

Referring to FIG. 9E, a functional encryption system 35 may include a first electronic device APP1 205, a second electronic device APP2 305, and a third electronic device APP3 405. The first electronic device 205 may include a first functional encryption device LWE-FE1 215. The second electronic device 305 may include a second functional encryption device LWE-FE2 315. The third electronic device 405 may include a third functional encryption device LWE-FE3 415.

The first functional encryption device 215 may include a key generator KGD configured to generate the public key pkh and the secret key skh.

The second functional encryption device 315 may include an encryptor ENCD configured to receive the public key pkh from the electronic device 205, receive the input data DI from an external device, and generate the encrypted data DE by encrypting the input data DI.

The third functional encryption device 415 may include a decryptor DECD configured to receive the secret key skh from the first electronic device 205, receive the encrypted data DE from the second electronic device 305, and generate the decrypted data DD by decrypting the encrypted data DE.

In some example embodiments, the second electronic device 305 may store the encrypted data DE in a nonvolatile memory device NVM.

The functional encryption using the LWE problem and the lattice problem according to example embodiments may be used in security policies of data associated with an inner product of two vectors. In some example embodiments, as will be described below with reference to FIGS. 10 through 18, the functional encryption may be used in a security policy of data for machine learning. In some example embodiments, as will be described below with reference to FIGS. 19, 20A, and 20B, the functional encryption may be used in a security policy of data for authentication. Example embodiments are not limited to the machine learning and authentication, and the functional encryption according to example embodiments may be used in various fields.

Figure 10:
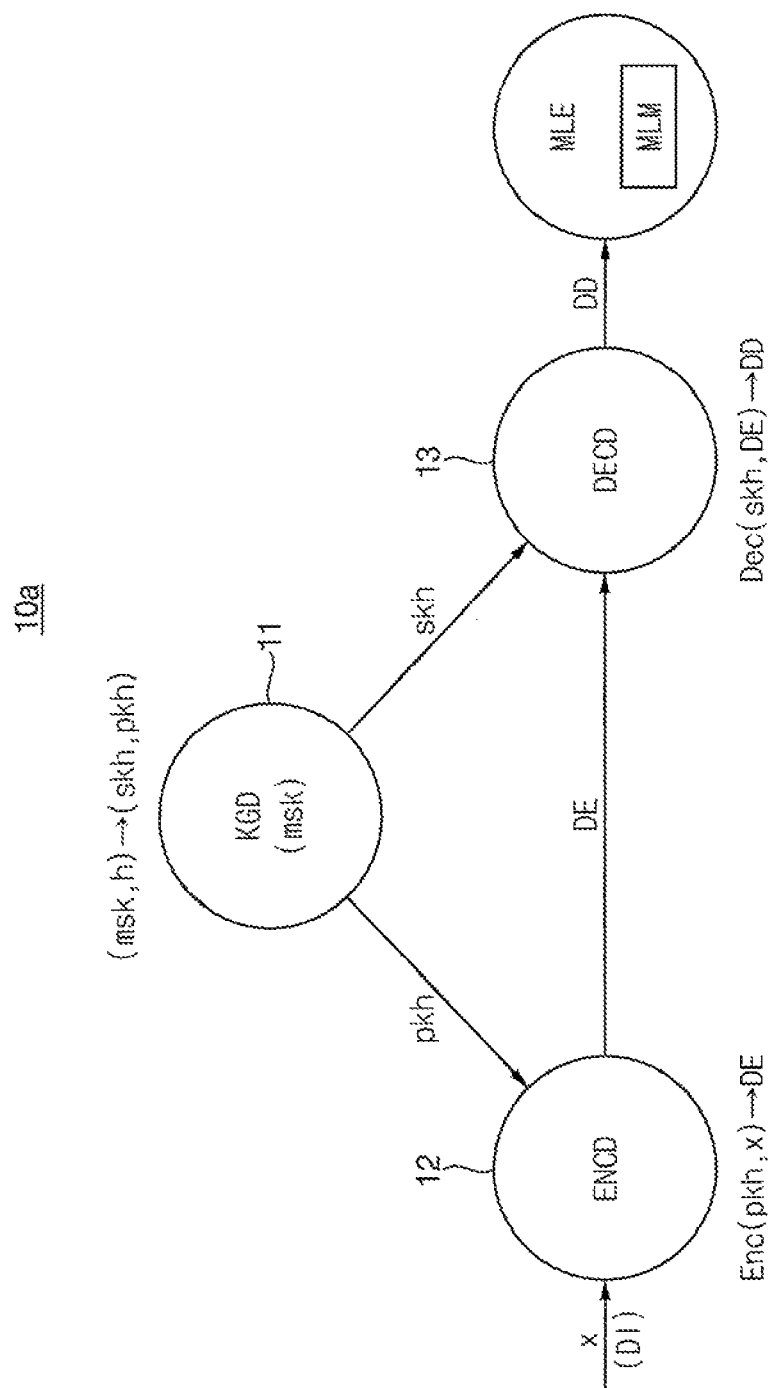
FIG. 10 is a diagram illustrating a functional encryption system of controlling a machine learning model according to example embodiments.

FIG. 10 is a diagram illustrating a functional encryption system of controlling a machine learning model according to example embodiments.

Referring to FIG. 10, a functional encryption system 10a may include a key generation device KGD 11, an encryption device ENCD 12, a decryption device DECD 13, and a machine learning engine MLE. The functional encryption system 10a may implement functional encryption using the key generation device 11, the encryption device 12, and the decryption device 13. The machine learning engine MLE may control a machine learning model MLM using results of the functional encryption.

Referring to FIGS. 2 and 10, the key generation device 11 may generate the public key pkh and the secret key skh, based on the master key msk and the parameter vector h (S100). The encryption device 12 may generate the encrypted data DE by encrypting the input vector x, based on the public key pkh (S200). The decryption device 12 may generate the decrypted data DD corresponding to the approximation value of the inner product of the parameter vector h and the input vector x by decrypting the encrypted data DE based on the secret key skh (S300).

The functional encryption using the LWE problem and the lattice problem may be used in security of data for machine learning. In some example embodiments, the parameter vector h may indicate parameters of a first hidden layer of a machine learning model, and the decrypted data DD may indicate an approximation value of the inner product $<h, x>$ of the parameter vector h and the input vector x. The inner product $<h, x>$ may correspond to node operations of the first hidden layer.

The machine learning engine MLE may receive the decrypted data DD corresponding to the input vector DI and the parameter vector h, and control a machine learning model MLM based on the decrypted data DD, where the input vector x indicates input data of the machine learning model MLM and the parameter vector h indicates parameters of a first hidden layer of the machine learning model MLM.

In other words, the machine learning engine MLE may control the machine learning model MLM, rather than the input data DI. In some example embodiments, as will be described below with reference to FIGS. 15 and 16, controlling the machine learning model MLM may include controlling an inference operation of the machine learning model MLM. In some example embodiments, as will be described below with reference to FIGS. 17 and 18, controlling the machine learning model MLM may include controlling a training operation of the machine learning model MLM in addition to the inference operation.

Figure 11A:
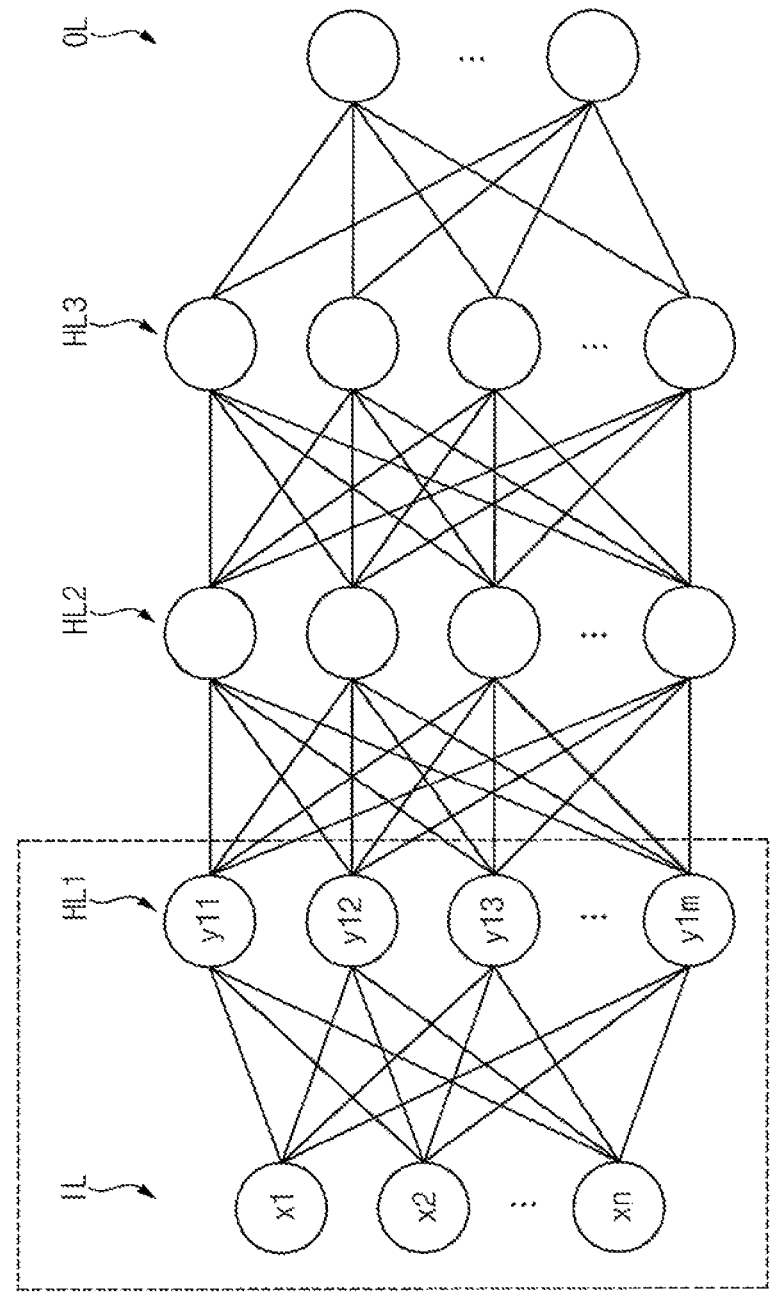
FIG. 11A is a diagram illustrating machine learning based on input data.

FIG. 11A is a diagram illustrating machine learning based on input data, and FIG. 11B is a diagram illustrating machine learning based on decrypted data generated by a method of controlling a machine learning model according to example embodiments.

Referring to FIGS. 11A and 11B, a machine learning model may include an input layer IL, a plurality of hidden layers HL1~HL3, and an output layer OL.

FIGS. 11A and 11B illustrate three hidden layers, that is, a first hidden layer HL1, a second hidden layer HL2, and a third hidden layer HL3 for convenience of illustration, and the machine learning model may include various numbers of hidden layers.

Example embodiments of the deep learning model or machine learning models are not limited to a specific neural network. The deep learning model may include, for example, at least one of a Generative Adversarial Network (GAN), Convolution Neural Network (CNN), Region with Convolution Neural Network (R-CNN), Region Proposal Network (RPN), Recurrent Neural Network (RNN), Stacking-based deep Neural Network (S-DNN), State-Space Dynamic Neural Network (S-SDNN), Deconvolution Network, Deep Belief Network (DBN), Restricted Boltzmann Machine (RBM), Fully Convolutional Network, Long Short-Term Memory (LSTM) Network, Classification Network, and Bayesian Neural Network (BNN).

Referring to FIG. 11A, the input layer IL may include n input nodes receiving n input data x1~xn, respectively. The first hidden layer HL1 may include m hidden nodes. The m hidden nodes in the first hidden layer HL1 may receive the n input data x1~xn from the input layer, and transfer m node output values y11~y1m to the second hidden layer HL2, where the m node output values are results of node operations.

FIG. 11B illustrates a decryption device DECD corresponding to the input layer IL and the first hidden layer HL1 in FIG. 11A.

The decryption device DECD may receive m encrypted data c1~cm and m secret keys skh1~skhm, and transfer m node output values y11'~y1m' corresponding to m hidden nodes in the first hidden layer HL1 to the second hidden layer HL2 by decrypting the m encrypted data c1~cm based on the m secret keys skh1~skm. Here, the m node output values correspond to the above-mentioned decrypted data DD, and each node output value y1j' (j=1~m) corresponds to the approximation value of the inner product of the parameter vector and the input vector of the corresponding hidden node.

As such, the machine learning engine MLE in FIG. 10 may control the machine learning model MLM based on the decrypted data y11'~y1m' in FIG. 11B, rather than the input data x1~xm in FIG. 11A. Referring to FIG. 11B, the machine learning engine MLE may apply the decrypted data y11'~y1m' as inputs of the second hidden layer HL2.

Hereinafter, example configurations and operations of the key generation device KGD, the encryption device ENC, and the decryption device DECD are described with reference to FIGS. 12, 13, and 14 using an example in which the first hidden layer HL1 includes the m hidden nodes.

Figure 12:
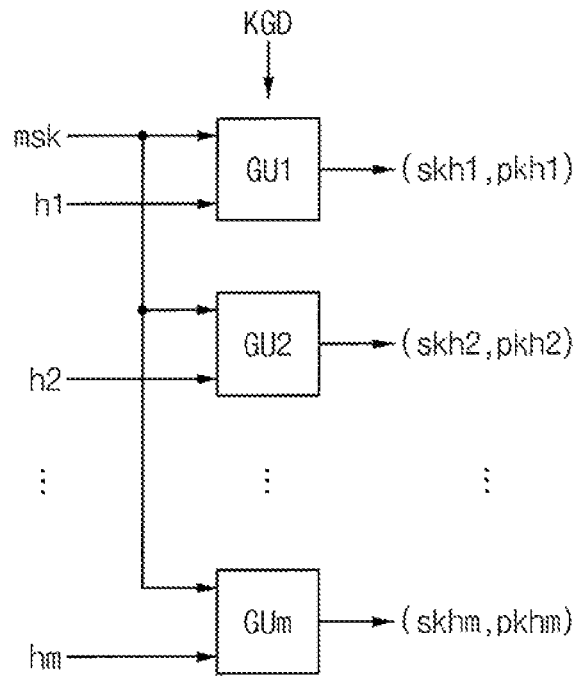
FIG. 12 is a block diagram illustrating a key generation device included in a functional encryption system according to example embodiments.

FIG. 12 is a block diagram illustrating a key generation device included in a functional encryption system according to example embodiments.

Referring to FIG. 12, the key generation device KGD may include m generation units GU1~GUm respectively corresponding to the m hidden nodes in the first hidden layer HL1.

Each generation unit GUj (j=1~m) may generate each public key vector pkhj and each secret key vector skhj based on the master key msk and each node parameter vector hj.

As such, the above-mentioned parameter vector h may include the m node parameter vectors h1~hm respectively corresponding to m hidden nodes in the first hidden layer HL1. Also, the above-mentioned secret key skh may include the m secret key vectors skh1~skhm respectively corresponding to the m hidden nodes. Also, the above-mentioned public key pkh may include the m public key vectors pkh1~pkhm respectively corresponding to the m hidden nodes.

Figure 13:
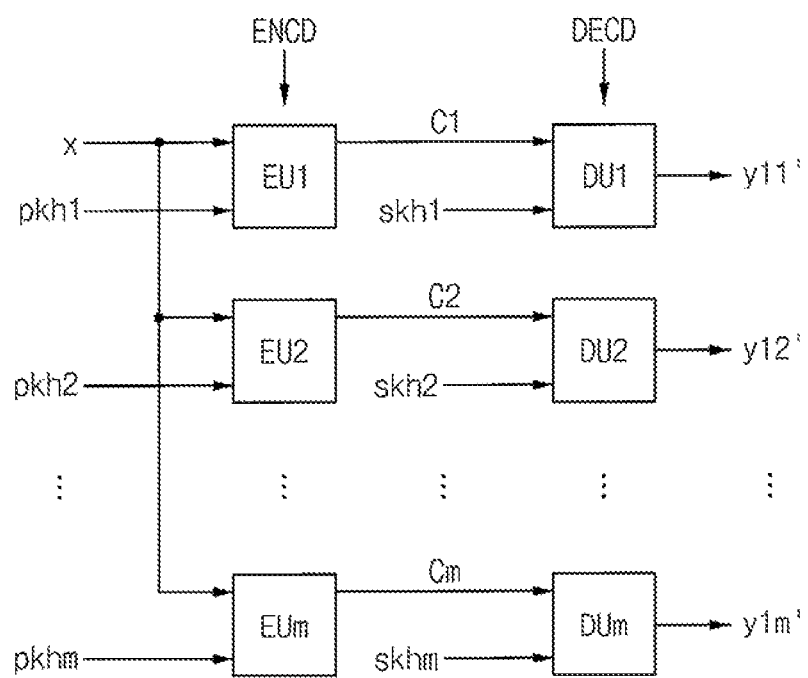
FIG. 13 is a block diagram illustrating an encryption device and a decryption device included in a functional encryption system according to example embodiments.

FIG. 13 is a block diagram illustrating an encryption device and a decryption device included in a functional encryption system according to example embodiments.

Referring to FIG. 13, the encryption device ENCD may include m encryption units EU1~EUm respectively corresponding to the m hidden nodes in the first hidden layer HL1. The decryption device DECD may include m decryption units DU1~DUm respectively corresponding to the m hidden nodes in the first hidden layer HL1, Each encryption unit EUj (j=1~m) may generate each node encrypted data cj by encrypting the input vector x based on each public key pkhj. Each decryption unit DUj may generate each node output value y1j' by decrypting each node encrypted data cj based on each secret key vector skhj. Each node output value y1j' may indicate an approximation value of an inner product of each parameter vector hj and the input vector x.

As such, the above-mentioned encrypted data DE may include the m node encrypted data c1~cm respectively corresponding to the m hidden nodes in the first hidden layer HL1. Also, the above-mentioned decrypted data DD may include the m node output values y11'~y1m' respectively corresponding to the m hidden nodes.

Figure 14:
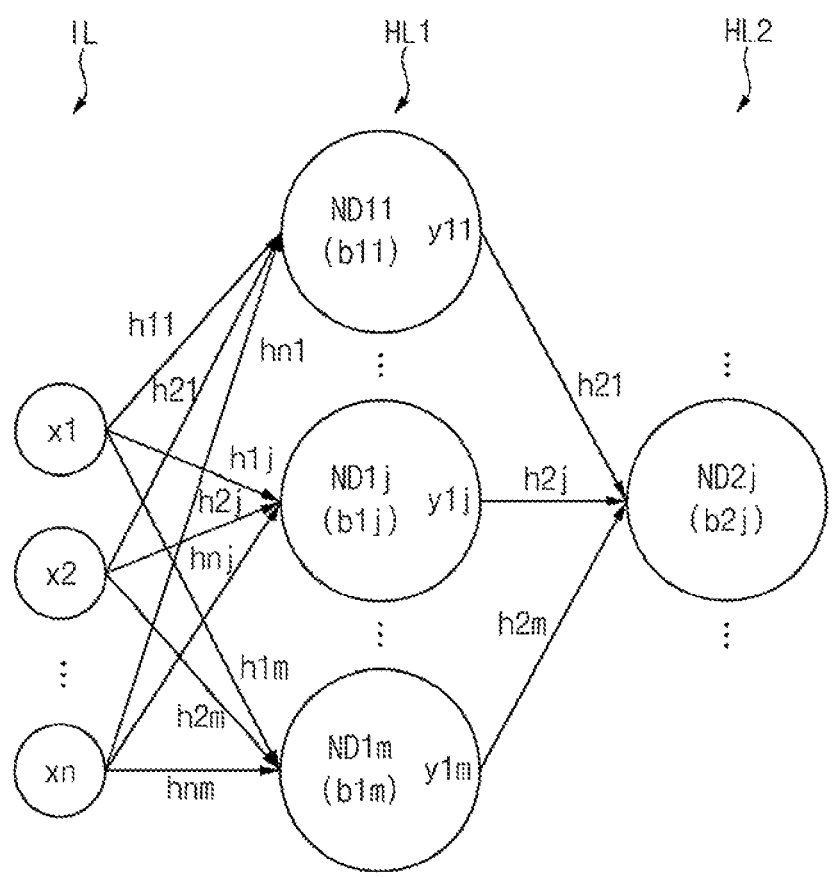
FIG. 14 is a diagram for describing a node operation by a hidden node in a first hidden layer according to example embodiments.

FIG. 14 is a diagram for describing a node operation by a hidden node in a first hidden layer according to example embodiments.

FIG. 14 illustrates a portion of the machine learning model for convenience of illustration. The input layer IL may receive n input values x1~xn, and the first hidden layer HL1 may include m hidden nodes ND11~ND1m.

Each hidden node ND1j (j=1~m) may perform a node operation based on n input values x1~xn, n weight values h1j~hnj, and a bias value bj, and may output each node output value y1j as Expression 9.

$$y1j = \sum_i xi \cdot hij + bj = \langle x, hj \rangle \quad \text{Expression 9}$$

In Expression 9, <x, hj> indicates an inner product of the input vector x and each node parameter vector hj. For the node operation reflecting the weight values h1j~hmj and the bias value bj of the hidden node ND1j, the input vector x and the node parameter vector hj may be generated as Expression 10 and Expression 11.

$$x=(1,x1,x2,\ldots,xn) \quad \text{Expression 10}$$

$$hj=(bj,w1j,w2j,\ldots,wnj) \quad \text{Expression 11}$$

In Expression 10 and Expression 11, x indicates the input vector, x1 through xn indicate input values of the input vector, hj indicates a node parameter vector corresponding to a j-th hidden node ND1j in the first hidden layer HL1, bj indicates a bias value corresponding to the j-th hidden node ND1j, and w1j through wnj indicate weight values corresponding to the j-th hidden node ND1j.

The m node output values y11~y1m from the first hidden layer HL1 may be transferred to each hidden node ND2j in the second hidden layer HL2. Each hidden node ND2j in the second hidden layer HL2 may perform a node operation based on the node output values y11~y1m from the first hidden layer HL1, the weight values h21~j2m, and the bias value b2j.

As described with reference to FIGS. 11A through 14, the parameter vector h may include the plurality of node parameter vectors h1~hm respectively corresponding to the plurality of nodes. Each secret key vector skhj (j=1~m), each public key vector pkhj, each node encrypted data cj, and each node output value j1j' corresponding to each node parameter vector hj may be generated by applying the functional encryption as described with reference to FIGS. 7A, 7B, and 7C with respect to each node parameter vector hj.

Figure 15:
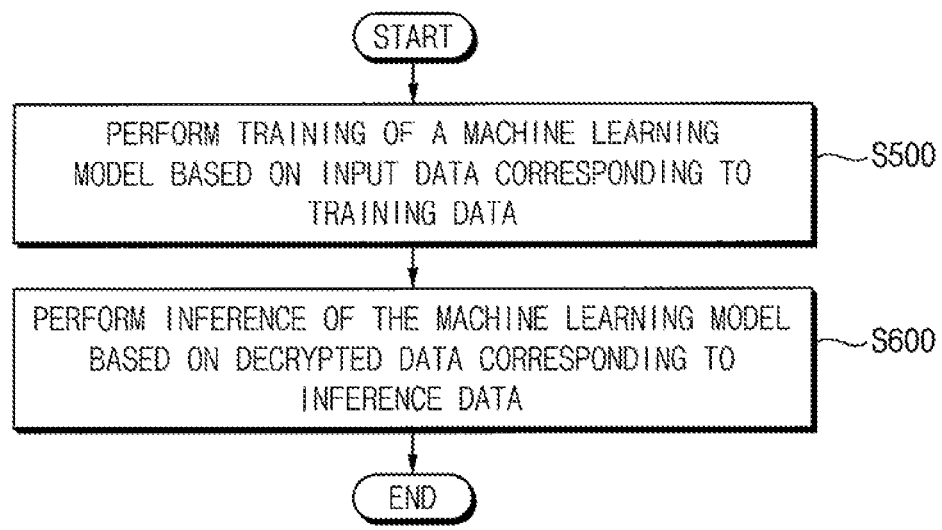
FIG. 15 is a flowchart illustrating a method of controlling a machine learning model according to example embodiments.
Figure 16:
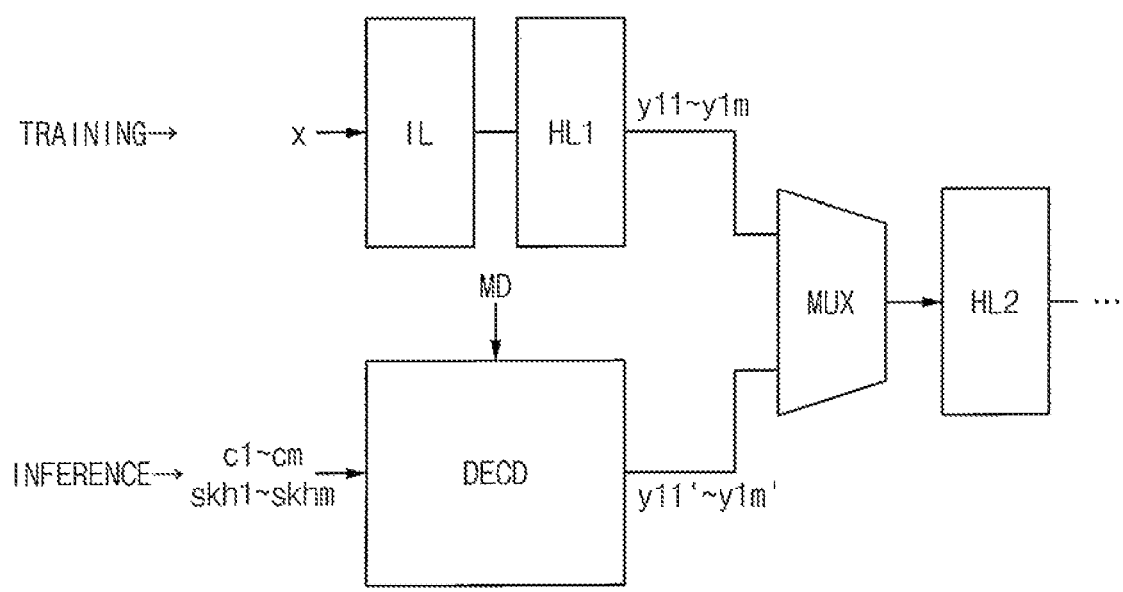
FIG. 16 is a diagram illustrating a configuration corresponding to the method of FIG. 15.

FIG. 15 is a flowchart illustrating a method of controlling a machine learning model according to example embodiments, and FIG. 16 is a diagram illustrating a configuration corresponding to the method of FIG. 15.

Referring to FIGS. 15 and 16, training of the machine learning model may be performed based on the input data corresponding to training data (S500), and inference of the machine learning model may be performed based on the decrypted data corresponding to inference data (S600).

During the training operation S500, the input vector x indicating the input data may be applied to the input layer IL. Also, the first hidden layer HL1 may perform the node operations based on the input vector x, and may output the m node output values y11~y1m corresponding to the m hidden nodes in the first hidden layer HL1.

During the inference operation S600, the decryptor DECD may replace the input layer IL and the first hidden layer HL1. The decryptor DECD may receive the m node encrypted data c1~cm and the m secret key vectors skh1~skhm respectively corresponding to the m hidden nodes in the first hidden layer HL1, and may output the m node output values y11'~y1m' respectively corresponding to the m hidden nodes. The m node output values y11'~y1m' may correspond to the decrypted data DD indicating the approximation value of the parameter vector and the input vector as described above.

The machine learning engine may include a selector MUX. The selector MUX may select the m node output values y11~y1m during the training operation, and may select the m node output values y11'~y1m' during the inference operation, to provide the selected data to the second hidden layer HL2.

Referring to FIGS. 15 and 16, the weight values and the bias values of the first hidden layer HL1 may be updated in example embodiments. In this regard, the parameter vector used in the inference of the machine learning model may include optimized weight values and optimized bias values of the first hidden layer HL1 that are determined depending on results of the training of the machine learning model, after the training of the machine learning model is completed.

Figure 17:
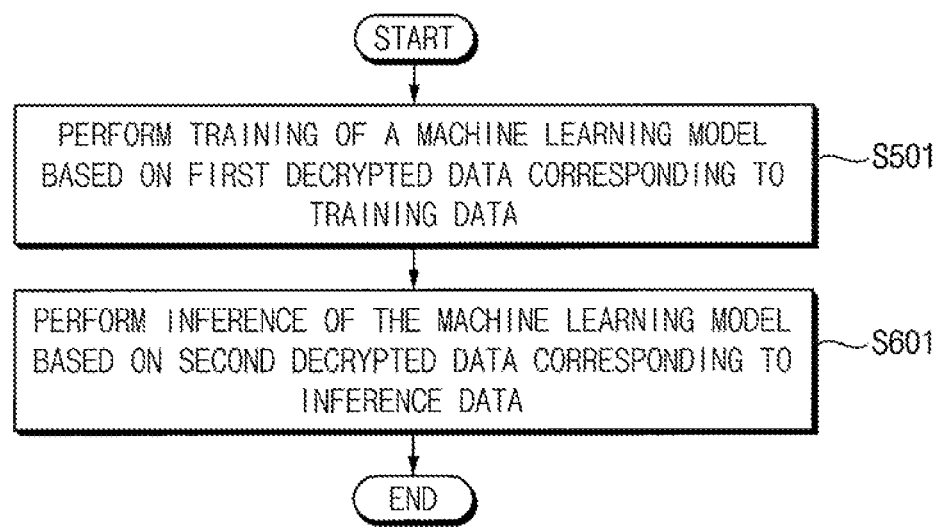
FIG. 17 is a flowchart illustrating a method of controlling a machine learning model according to example embodiments.
Figure 18:
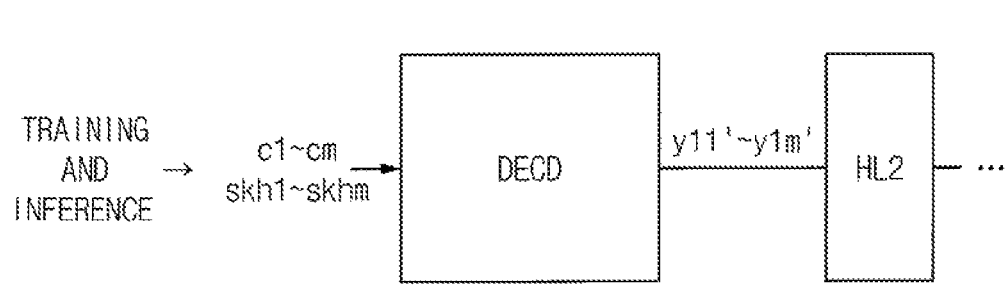
FIG. 18 is a diagram illustrating a configuration corresponding to the method of FIG. 17.

FIG. 17 is a flowchart illustrating a method of controlling a machine learning model according to example embodiments. FIG. 18 is a diagram illustrating a configuration corresponding to the method of FIG. 17.

Referring to FIGS. 17 and 18, training of the machine learning model may be performed based on first decrypted data corresponding to training data (S501), and inference of the machine learning model may be performed based on second decrypted data corresponding to inference data (S601).

Regardless of training and inference operations, the decryptor DECD may replace the input layer IL and the first hidden layer HL1. The decryptor DECD may receive the m node encrypted data c1~cm and the m secret key vectors skh1~skhm respectively corresponding to the m hidden nodes in the first hidden layer HL1, and may output the m node output values y11'~y1m' respectively corresponding to the m hidden nodes. The m node output values y11'~y1m' may correspond to the decrypted data DD indicating the approximation value of the parameter vector and the input vector as described above.

The parameter vector used in the training of the machine learning model may include initial weight values and initial bias values of the first hidden layer. The initial weight values and the initial bias values may be determined when the machine learning model is designed.

In some example embodiments, weight values and bias values of the first hidden layer HL1 may not be updated, and may be fixed to the initial weight values and the initial bias values during the training of the machine learning model. As a result, the parameter vector used in the inference of the machine learning model may be equal to the parameter vector used in the training of the machine learning model. In this case, the first hidden layer HL1 may be a kind of dummy layer for implementing security.

In some example embodiments, weight values and bias values of the first hidden layer may be updated during the training of the machine learning model. In this case, the parameter vector used in the inference of the machine learning model may include optimized weight values and optimized bias values of the first hidden layer HL1 that are determined depending on results of the training of the machine learning model after the training of the machine learning model is completed.

Figure 19:
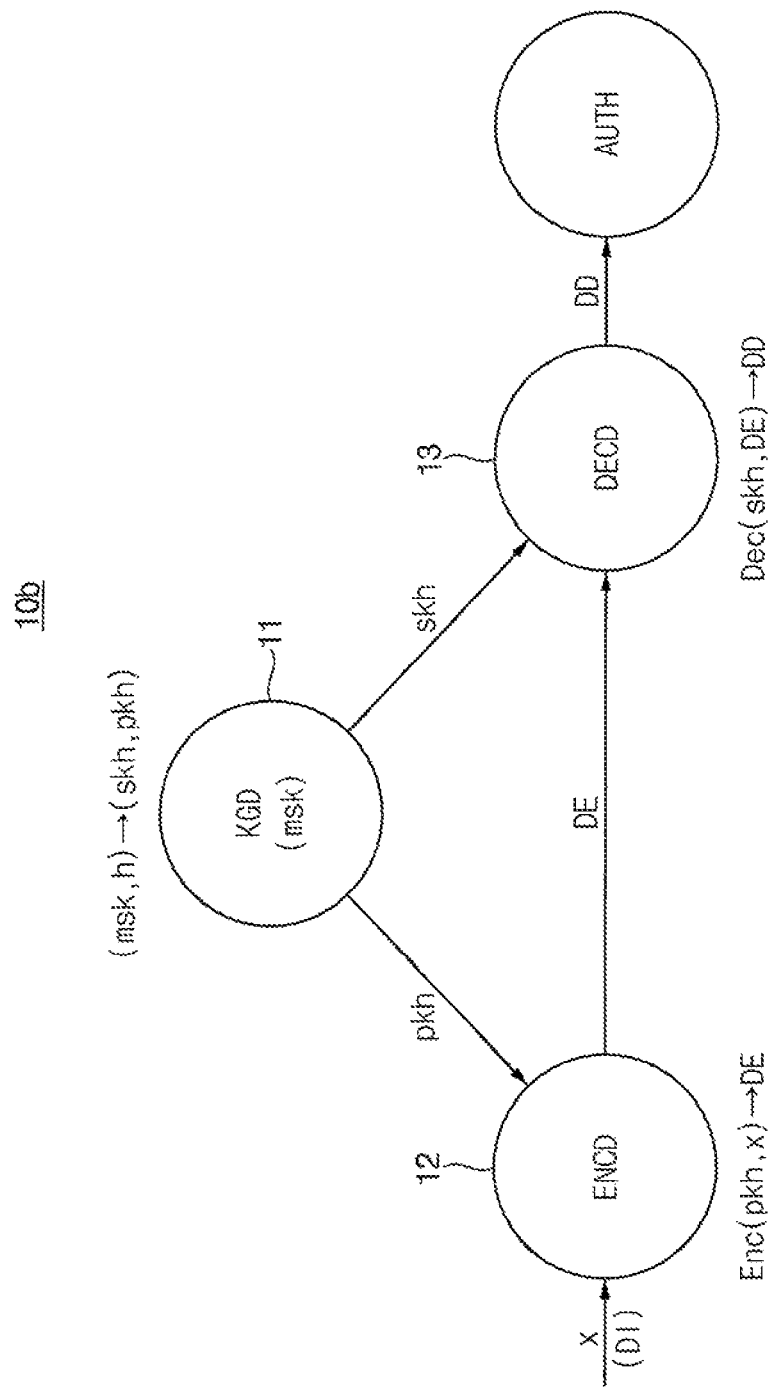
FIG. 19 is a diagram illustrating a functional encryption system of performing authentication according to example embodiments.

FIG. 19 is a diagram illustrating a functional encryption system of performing authentication according to example embodiments.

Referring to FIG. 19, a functional encryption system 10b includes a key generation device KGD 11, an encryption device ENCD 12, a decryption device DECD 13, and an authentication module AUTH. The functional encryption system 10b may implement functional encryption using the key generation device 11, the encryption device 12, and the decryption device 13. The authentication module AUTH may perform authentication of input data DI using results of the functional encryption.

Referring to FIGS. 2 and 19, the key generation device 11 may generate the public key pkh and the secret key skh, based on the master key msk and the parameter vector h (S100). The encryption device 12 may generate the encrypted data DE by encrypting the input vector x, based on the public key pkh (S200). The decryption device 12 may generate the decrypted data DD corresponding to the approximation value of the inner product of the parameter vector h and the input vector x by decrypting the encrypted data DE based on the secret key skh (S300).

The functional encryption using the LWE problem and the lattice problem may be used in security of data for authentication. In some example embodiments, the parameter vector h may indicate parameters to extract features of the input data DI, and the decrypted data DD may indicate an approximation value of the inner product <h, x> of the parameter vector h and the input vector x. The inner product <h, x> may correspond to node operations of the first hidden layer. The input data DI may indicate private information of a user and the input data DI may be biometric information corresponding to iris, fingerprint, DNA, retina, vein, face, voice, unique gait, etc., of the user.

The authentication module AUTH may receive the decrypted data DD corresponding to the input vector DI indicating private information of a user and determine genuineness of the private information. In other words, the authentication module AUTH may perform authentication of the input data DI based on the decrypted data DD rather than the input data DI.

Figure 20A:
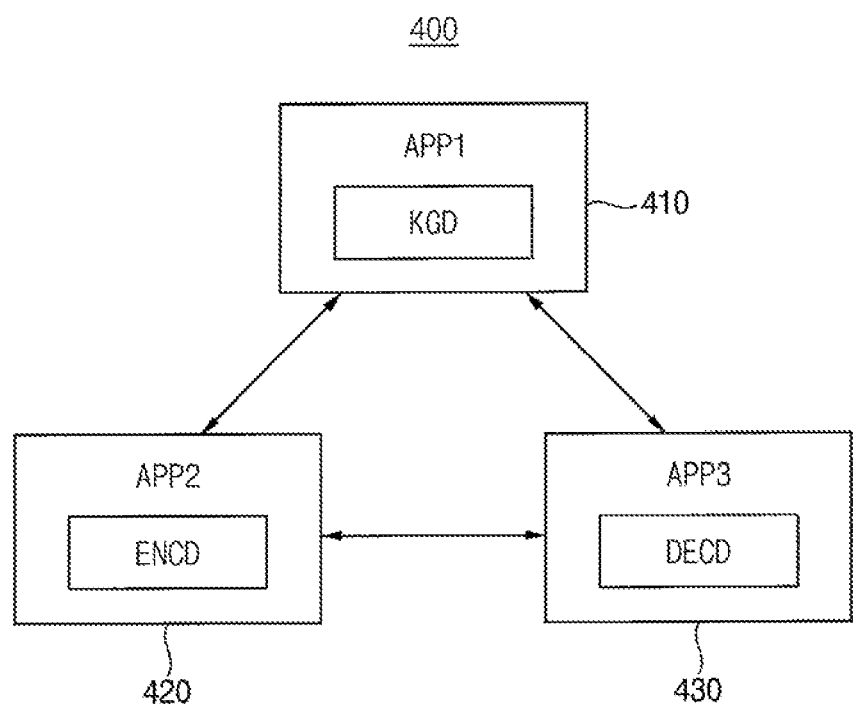
FIGS. 20A and 20B are block diagrams illustrating an authentication system according to example embodiments.
Figure 20B:
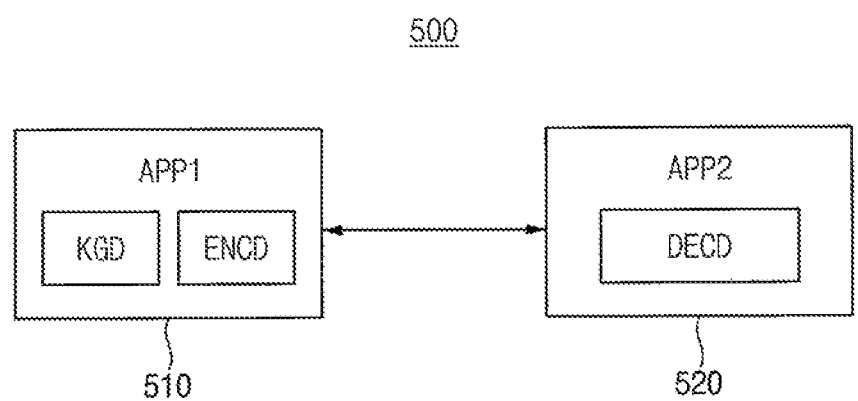

FIGS. 20A and 20B are block diagrams illustrating an authentication system according to example embodiments.

Referring to FIG. 20A, an authentication system 400 includes a first electronic device APP1 410, a second electronic device APP2 420, and a third electronic device APP3 430. The first electronic device 410 may correspond to a registration request apparatus, the second electronic device 420 may correspond to an authentication request apparatus, and the third electronic device 430 may correspond to an authentication server.

The registration request apparatus 410 is an apparatus that receives registration target personal information, and registers an authentication key and registration values for the registration target personal information in the authentication server 430.

In this case, the registration target personal information may be, for example, biometric information, such as iris, fingerprints, DNA, retina, veins, gait, face, voice, and the like, and may further include various forms of information that can be used in verifying the identity of each individual. In addition, the registration request apparatus 410 may include various forms of input means, such as a sensor, a camera, and the like, in order to receive the registration target personal information.

The registration request apparatus 410 may include a key generation device KGD configured to generate a public key and a secret key based on a parameter vector and a master key. The registration request apparatus 410 may transmit the public key to the authentication request apparatus 420, and transmit the secret key to the authentication server 430. In addition, the registration request apparatus 410 may calculate an inner product of a parameter vector and an input vector corresponding to the registration target personal information, and may transmit the inner product as a registration value to the authentication server 430.

Meanwhile, the master key and the secret key may be generated in, for example, a secure area of the registration request apparatus 410, such as a secure element (SE), a trusted execution environment (TEE), or the like. In addition, the registration request apparatus 410 may delete the master key and the secret key after the secret key is provided to authentication server 430.

The authentication request apparatus 420 is an apparatus that receives authentication target personal information and requests the authentication server 430 to perform authentication of the authentication target personal information.

The authentication request apparatus 420 may include an encryption device ENCD configured to encrypt the input data corresponding to the authentication target personal information based on the public key to generate encrypted data. In this case, the authentication target personal information may have the same form as the registration target personal information. In addition, the authentication request apparatus 420 may include various forms of input means, such as a sensor, a camera, and the like, for receiving the authentication target personal information.

The authentication request apparatus 420 receives the public key from the registration request apparatus 410, and stores the received public key. In addition, when the authentication target personal information is input, the authentication request apparatus 420 may generate the encrypted data for the authentication target personal information using the stored public key and authentication target personal information, and may transmit the generated encrypted data to the authentication server 430 to request the authentication of the authentication target personal information. In this case, the encrypted data for the authentication target personal information may be generated in the secure area of the authentication request apparatus 420.

The authentication server 430 is a server for authentication of the authentication target personal information using the secret key received from the registration request apparatus 420 and the encrypted data received from the authentication request apparatus 420.

The authentication server 430 may store the secret key and the registration value received from the registration request apparatus 410. When the authentication server 430 receives the encrypted data for the authentication target personal information from the authentication request apparatus 420, the authentication server 430 may perform authentication of authentication target personal information using the stored secret key and the registration value, and may transmit the authentication result to the authentication request apparatus 420.

The authentication server 430 may include a decryption device DECD configured to generate decrypted data corresponding to an approximation value of an inner product of the parameter vector and the input vector for the authentication target personal information by decrypting the encrypted data based on the secret key.

The authentication server 430 may include an authentication module as described with reference to FIG. 19. The authentication module may perform authentication by comparing the registration value provided from registration request apparatus 410 with the decrypted data provided from the decryption device DECD. The registration value may indicate the inner product of the parameter vector and the input vector for the registration target personal information, and the decrypted data may indicate the approximation value of the inner product of the parameter vector and the input vector for the authentication target personal information. The authentication module may determine genuineness of the authentication target personal information when a difference between the registration value and the decrypted data is smaller than a predetermined reference value, and may determine counterfeitness of the authentication target personal information when the difference is greater than the reference value.

Referring to FIG. 20B, an authentication system 500 may include a first electronic device APP1 510 and a second electronic device APP2 520. The first electronic device 510 may correspond to a registration and authentication request apparatus. The second electronic device 520 may correspond to an authentication server.

Unlike the authentication system 400 shown in FIG. 20A (in which the registration request apparatus 410 and the authentication request apparatus 420 are separately implemented), the registration request apparatus and the authentication request apparatus are implemented as a single apparatus, i.e., the registration and authentication request apparatus 510 in the authentication system 500 shown in FIG. 20B. In this case, the registration and authentication request apparatus 510 may include the key generation device KGD and the encryption device ENCD, and the authentication server 520 may include the decryption device DECD.

Figure 21:
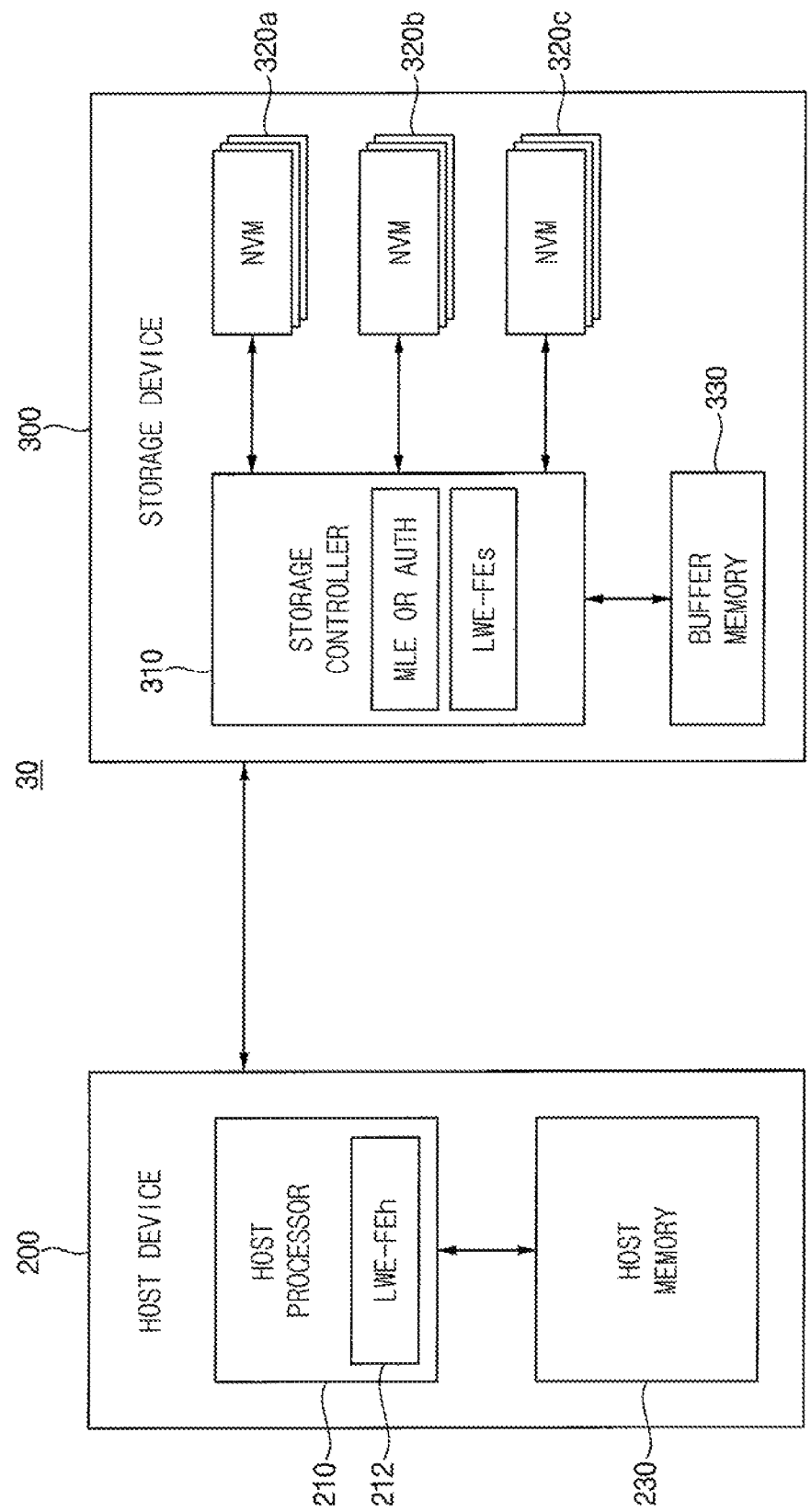
FIG. 21 is a block diagram illustrating a storage system including a storage device according to example embodiments.

FIG. 21 is a block diagram illustrating a storage system including a storage device according to example embodiments.

Referring to FIG. 21, a storage system 30 may include a host device 200 and a storage device 300.

The host device 200 may control overall operations of the storage system 30. The host device 200 may include a host processor 210 and a host memory 230.

The host processor 210 may control an operation of the host device 200. For example, the host processor 210 may execute an operating system (OS). For example, the operating system may include a file system for file management and a device driver for controlling peripheral devices, including the storage device 300 at the operating system level. For example, the host processor 210 may include at least one of various processing units, e.g., a central processing unit (CPU), or the like.

The host memory 230 may store instructions and/or data that are executed and/or processed by the host processor 210. For example, the host memory 230 may include at least one of various volatile memories, e.g., a dynamic random access memory (DRAM), or the like.

The storage device 300 is accessed by, that is, communicably coupled to, the host device 200. The storage device 300 may include a storage controller 310, a plurality of nonvolatile memories 320a, 320b, and 320c, and a buffer memory 330.

The storage controller 310 may control an operation of the storage device 300, e.g., a data write operation and/or a data read operation, based on a command and data that are received from the host device 200.

The storage system 30 may generate a public key and a secret key based on a master key and a parameter vector, generate encrypted data by encrypting, based on the public key, an input vector, and generate decrypted data corresponding to an approximation value of an inner product of the parameter vector and the input vector by decrypting the encrypted data based on the secret key.

To realize such functional encryption, the storage controller 310 may include a storage functional encryption device LWE-FEs and the host device 200 may include a host functional encryption device LWE-FEh 212. Even though FIG. 21 illustrates that the host functional encryption device LWE-FEh is included in the host processor 210, example embodiments are not limited thereto and the host functional encryption device LWE-FEh may be implemented as an independent processing circuit distinct from the host processor 210. In some example embodiments, the host functional encryption device LWE-FEh may be omitted.

The storage controller 310 may include a machine learning engine MLE or an authentication module AUTH.

In some example embodiments, as described above with reference to FIGS. 10 through 18, the storage functional encryption device LWE-FEs may provide the decrypted data rather than the input data for the machine learning model to the machine learning engine MLE, and the machine learning engine MLE may control the machine learning model based on the decrypted data.

In some example embodiments, as described above with reference to FIGS. 19, 10A, and 20B, the storage functional encryption device LWE-FEs may provide the decrypted data rather than the input data for the private information or the authentication target personal information to the authentication module AUTH, and the authentication module AUTH may perform authentication for the authentication target personal information based on the decrypted data.

The plurality of nonvolatile memories 320a, 320b, and 320c may store a plurality of data to perform the functional encryption according to example embodiments.

In some example embodiments, each of the plurality of nonvolatile memories 320a, 320b, and 320c may include a NAND flash memory. In other example embodiments, each of the plurality of nonvolatile memories 320a, 320b, and 320c may include one of an electrically erasable programmable read-only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), a thyristor random access memory (TRAM), or the like.

The buffer memory 330 may store instructions and/or data that are executed and/or processed by the storage controller 310, and may temporarily store data stored in or to be stored into the plurality of nonvolatile memories 320a, 320b, and 320c. For example, the buffer memory 330 may include at least one of various volatile memories, e.g., a static random access memory (SRAM), a DRAM, or the like.

In some example embodiments, the storage device 300 may be a universal flash storage (UFS). In other example embodiments, the storage device 300 may be a solid-state drive (SSD), a multi-media card (MMC), or an embedded multi-media card (eMMC). In still other example embodiments, the storage device 300 may be one of a secure digital (SD) card, a micro SD card, a memory stick, a chip card, a universal serial bus (USB) card, a smart card, a compact flash (CF) card, or the like.

In some example embodiments, the storage device 300 may be connected to the host device 200 via a block accessible interface which may include, for example, a UFS, an eMMC, a serial advanced technology attachment (SATA) bus, a nonvolatile memory express (NVMe) bus, a serial attached SCSI (SAS) bus, or the like. The storage device 300 may use a block accessible address space corresponding to an access size of the plurality of nonvolatile memories 320a, 320b, and 320c to provide the block accessible interface to the host device 200, for allowing the access by units of a memory block with respect to data stored in the plurality of nonvolatile memories 320a, 320b, and 320c.

As described above, the functional encryption system and the method of performing functional encryption according to example embodiments may reinforce security of data used in machine learning, biometric authentication, etc. and block attacks using quantum computers by incurring random noise in the decrypted data based on the functional encryption using the LWE problem and the lattice problem.

Some example embodiments may provide a functional encryption system and a method of performing functional encryption, capable of reinforcing security of data used in machine learning, biometric authentication, and so on.

The functional encryption system and the method of performing functional encryption according to example embodiments may reinforce security of data used in machine learning, biometric authentication, etc., and may block attacks using quantum computers by incurring random noise in the decrypted data based on the functional encryption using the LWE problem and the lattice problem.

Example embodiments may be applied to various electronic devices and systems requiring security of data for machine learning, authentication, and so on. For example, example embodiments may be applied to systems such as a memory card, a solid-state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a server system, an automotive driving system, etc.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A functional encryption system, comprising:
a key generation device configured to generate a public key and a secret key, based on a master key and a parameter vector;
an encryption device configured to generate encrypted data by encrypting an input vector, based on the public key; and
a decryption device configured to generate decrypted data that is an approximation value of an inner product of the parameter vector and the input vector by decrypting the encrypted data based on the secret key,
wherein the approximation value of the inner product includes an inner product error value corresponding to a difference between the decrypted data and the inner product,
wherein the key generation device is further configured to generate an encrypted parameter vector including an amplified parameter vector corresponding to a multiplication of the parameter vector and an error factor value, and
wherein when the decryption device generates the decrypted data, the inner product error value is decreased as the error factor value is increased.

2. The functional encryption system as claimed in claim 1, wherein the key generation device generates the public key based on the encrypted parameter vector.

3. The functional encryption system as claimed in claim 1, wherein the encryption device generates the encrypted data including an amplified inner product of the amplified parameter vector and the input vector.

4. The functional encryption system as claimed in claim 1, wherein the key generation device generates the encrypted parameter vector by performing a matrix multiplication of an inverse matrix of a random matrix and the amplified parameter vector, and generates the public key by performing a matrix multiplication of the random matrix and the encrypted parameter vector.

5. The functional encryption system as claimed in claim 1, wherein the key generation device generates the secret key corresponding to a random vector.

6. The functional encryption system as claimed in claim 1, wherein the key generation device, the encryption device, and the decryption device generate the public key, the secret key, the encrypted data, and the decrypted data based on functional encryption using a learning with error (LWE) problem and a lattice problem.

7. The functional encryption system as claimed in claim 1, further comprising:
a machine learning engine configured to receive the decrypted data corresponding to the input vector and the parameter vector, and to control a machine learning model based on the decrypted data, where the input vector indicates input data of the machine learning model and the parameter vector indicates parameters of a first hidden layer of the machine learning model.

8. The functional encryption system as claimed in claim 1, further comprising:
an authentication module configured to receive the decrypted data corresponding to the input vector indicating private information of a user, and to determine genuineness of the private information.

9. The functional encryption system as claimed in claim 1, wherein the key generation device generates the public key such that the public key includes a plurality of public keys, and the plurality of public keys include a main public key that is generated based on the parameter vector.

10. The functional encryption system as claimed in claim 9, wherein the encryption device generates the encrypted data such that the encrypted data include a plurality of encrypted data respectively corresponding to the plurality of public keys, and the plurality of encrypted data include main encrypted data that are generated based on the main public key and the input vector.

11. The functional encryption system as claimed in claim 1, wherein the key generation device generates an encrypted parameter vector based on a following expression:

$$v = s - (A)^{-1} \cdot Nh - u$$

where v indicates the encrypted parameter vector, s indicates a random vector, A indicates a random matrix, N indicates an error factor value, h indicates the parameter vector, and u indicates the master key.

12. The functional encryption system as claimed in claim 11, wherein the key generation device generates the public key and the secret key based on the following expression:

$$(skh, pkh) = (s, (pk1, pk2, pk3))$$

$$pk1 = A \cdot s + e$$

$$pk2 = A$$

$$pk3 = A \cdot v + f$$

where skh indicates the secret key, pkh indicates the public key, pk1, pk2, and pk3 indicate first, second, and third public keys included in the public key, and e and f indicate random vectors.

13. The functional encryption system as claimed in claim 12, wherein the encryption device generates the encrypted data based on the following expression:

$$DE = (C_1, C_2, C_3)$$

$$C_1 = pk1^T \cdot w + e'$$

$$C_2 = pk2 \cdot (x + w) + e''$$

$$C_3 = pk3^T \cdot x + e'''$$

where DE indicates the encrypted data, $C_1$, $C_2$, and $C_3$ indicate first, second, and third encrypted data included in the encrypted data, w and e'' indicate random vectors, x indicates the input vector, and e' and e''' indicate random scalar values.

14. The functional encryption system as claimed in claim 13, wherein the decryption device generates the decrypted data based on the following expression:

$$DD = \frac{1}{N} \cdot (skh^T \cdot C_2 - C_1 - C_3) = h^T \cdot x + E$$

where DD indicates the decrypted data, and E indicates the inner product error value corresponding to a difference between the decrypted data and the inner product.

15. The functional encryption system as claimed in claim 14, wherein the inner product error value is inversely proportional to the error factor value.

16. A functional encryption system, comprising:
a key generation device configured to generate a plurality of public keys and a secret key, based on a master key and a parameter vector;
an encryption device configured to generate a plurality of encrypted data respectively corresponding to the plurality of public keys by encrypting an input vector, based on the plurality of public keys; and
a decryption device configured to generate decrypted data that is an approximation value of an inner product of the parameter vector and the input vector by decrypting the plurality of encrypted data based on the secret key,
wherein the key generation device, the encryption device, and the decryption device generate the plurality of public keys, the secret key, the plurality of encrypted data, and the decrypted data based on functional encryption using a learning with error (LWE) problem and a lattice problem,
wherein the approximation value of the inner product includes an inner product error value corresponding to a difference between the decrypted data and the inner product,
wherein the key generation device is further configured to generate an encrypted parameter vector including an amplified parameter vector corresponding to a multiplication of the parameter vector and an error factor value, and
wherein when the decryption device generates the decrypted data, the inner product error value is decreased as the error factor value is increased.

17. The functional encryption system as claimed in claim 16,
wherein the key generation device is further configured to gnerate a main public key based on the encrypted parameter vector, the plurality of public keys including the main public key, and
wherein the encryption device is further configured to generate main encrypted data including an amplified inner product of the amplified parameter vector and the input vector.

18. A method of performing functional encryption, comprising:
generating a public key and a secret key, based on a master key and a parameter vector;
generating encrypted data by encrypting an input vector, based on the public key;
generating an encrypted parameter vector including an amplified parameter vector corresponding to a multiplication of the parameter vector and an error factor value; and
generating decrypted data corresponding to an approximation value of an inner product of the parameter vector and the input vector by decrypting the encrypted data based on the secret key,
wherein the approximation value of the inner product includes an inner product error value corresponding to a difference between the decrypted data and the inner product, and
wherein when the decrypted data is generated, the inner product error value is decreased as the error factor value is increased.

19. The method as claimed in claim 18, further comprising at least one of:
controlling a machine learning model based on the decrypted data corresponding to the input vector and the parameter vector, where the input vector indicates input data of the machine learning model and the parameter vector indicates parameters of a first hidden layer of the machine learning model; and
determining genuineness of private information of a user based on the decrypted data corresponding to the input vector, where the input vector indicates the private information of the user.

* * * * *